United States Patent [19]
Barber et al.

[11] Patent Number: 5,825,105
[45] Date of Patent: Oct. 20, 1998

[54] MAGNETIC LEVITATION AND SYSTEMS FOR THE SUPPORT AND CONVEYANCE OF USEFUL PAYLOADS

[75] Inventors: John B. Barber, Westlake Village, Calif.; Duane B. Barber, Ithaca, N.Y.

[73] Assignee: Modern Transport Systems, Corp., Westlake Village, Calif.

[21] Appl. No.: 835,220

[22] Filed: Apr. 7, 1997

[51] Int. Cl.⁶ ................................................. H02K 41/00
[52] U.S. Cl. ................................................. 310/12; 310/90.5
[58] Field of Search .................................. 104/281, 282, 104/283, 290; 310/12, 90.5

[56] References Cited

U.S. PATENT DOCUMENTS

| | | | |
|---|---|---|---|
| 3,125,964 | 3/1964 | Silverman | 104/89 |
| 3,741,613 | 6/1973 | Pfaler | 308/10 |
| 4,142,469 | 3/1979 | Polgreen | 104/148 |
| 4,324,185 | 4/1982 | Vinson | 104/283 |
| 4,711,182 | 12/1987 | Alexandrov et al. | 104/283 |
| 5,134,324 | 7/1992 | Sakagami et al. | 310/12 |
| 5,218,257 | 6/1993 | Tozoni | 310/90.5 |
| 5,319,275 | 6/1994 | Tozoni | 310/90.5 |
| 5,440,997 | 8/1995 | Crowley | 104/283 |

*Primary Examiner*—Thomas M. Dougherty
*Assistant Examiner*—Judson H. Jones
*Attorney, Agent, or Firm*—Daniel Rubin

[57] ABSTRACT

A system of supporting useful payloads via magnetic forces using magnets of unmodulated strength operating in attractive mode without the necessity of complex sensing and control for maintaining a payload lift. Disclosed are embodiments of or lifting, conveying, and/or transporting of loads including various features for enhancing performance and stability thereof.

35 Claims, 19 Drawing Sheets

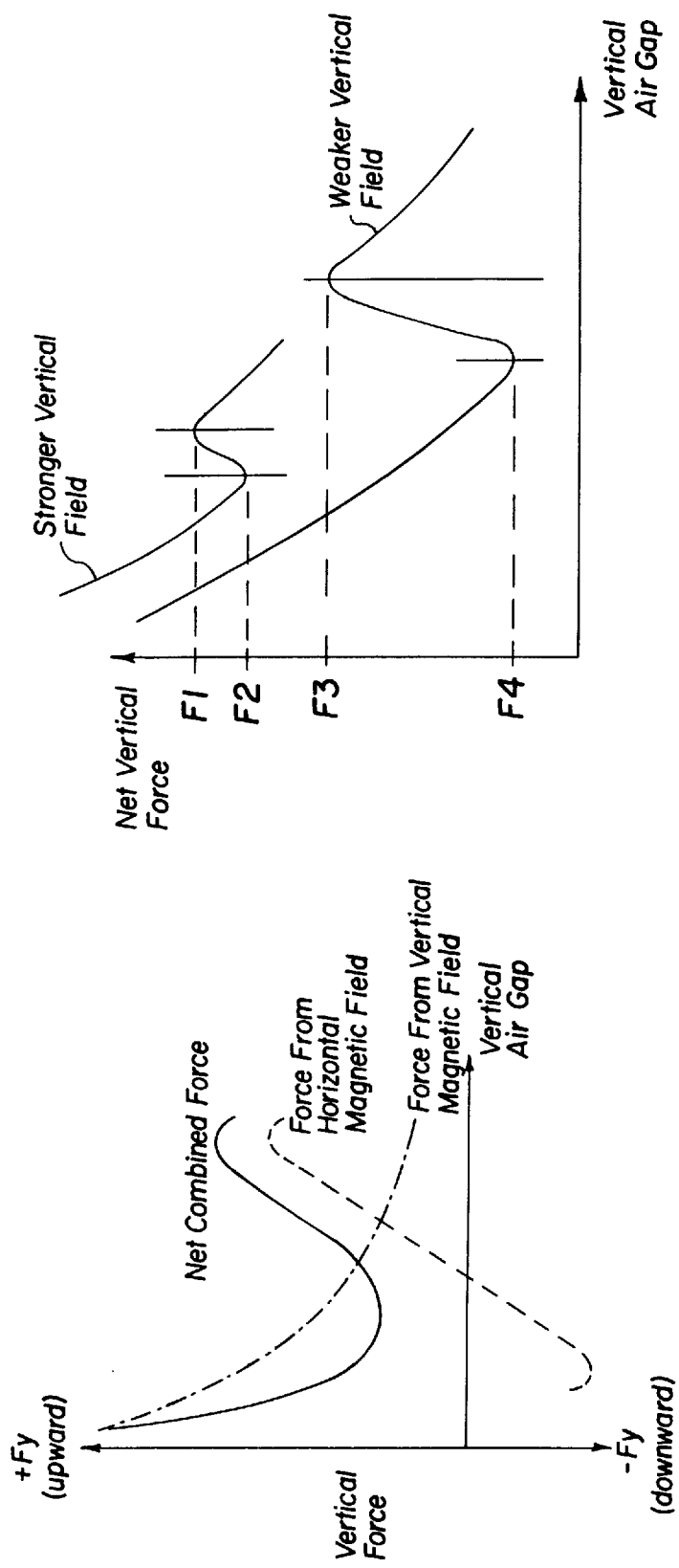

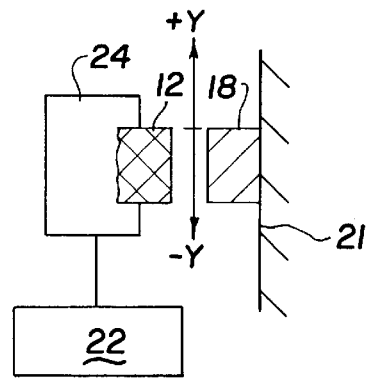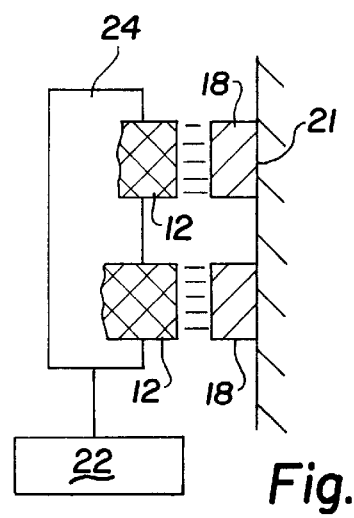
Fig. 6(a)　　　　　　Fig. 6(b)
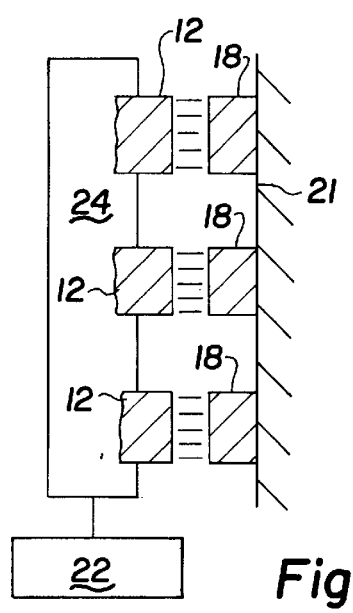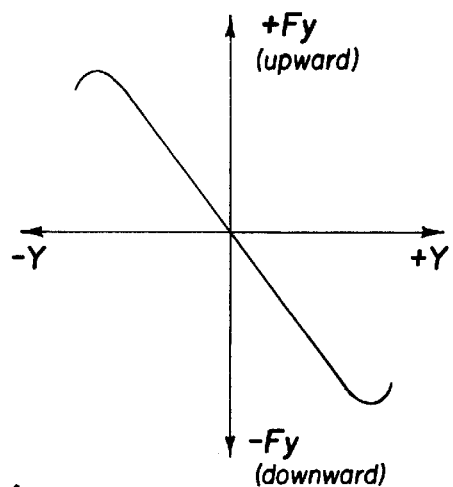
Fig. 6(c)　　　　　　Fig. 6(d)
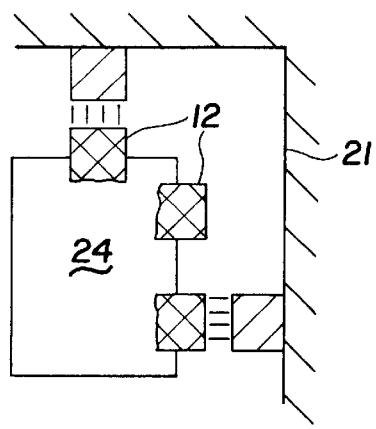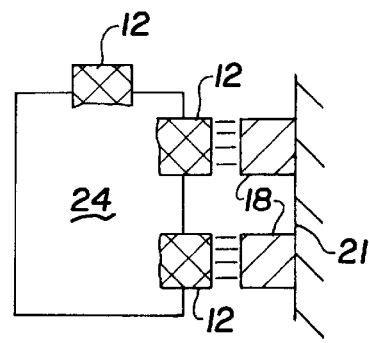
Fig. 7(a)　　　　　　Fig. 7(b)

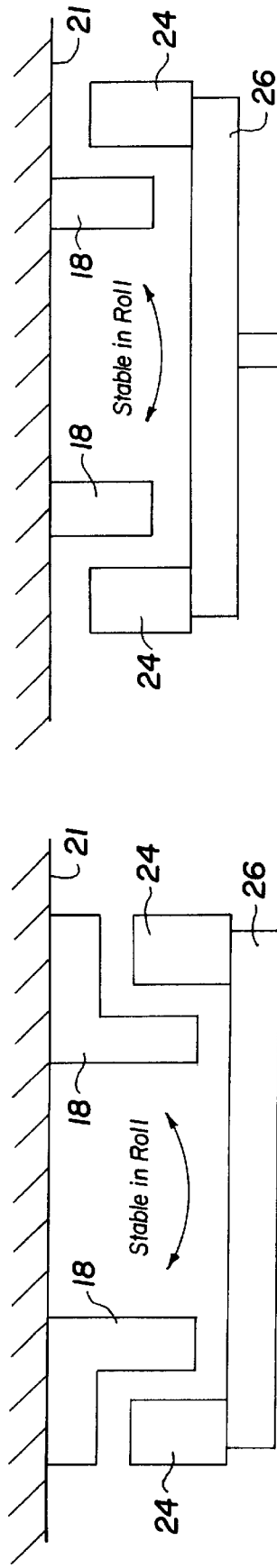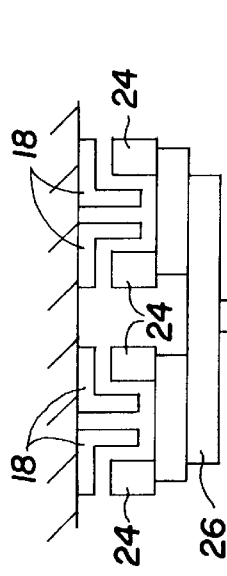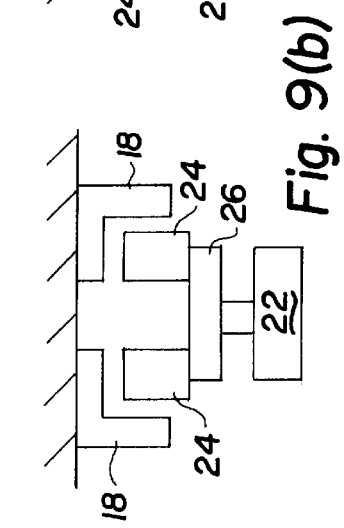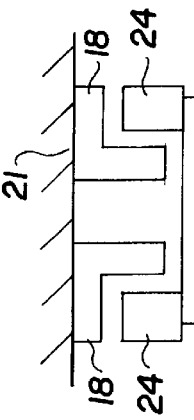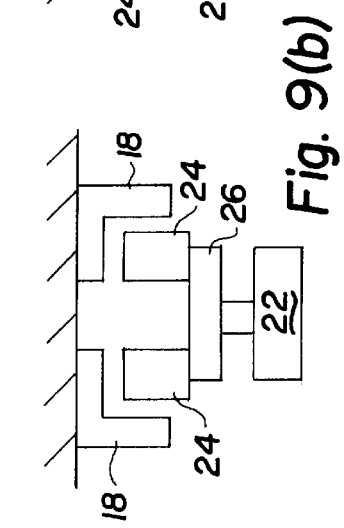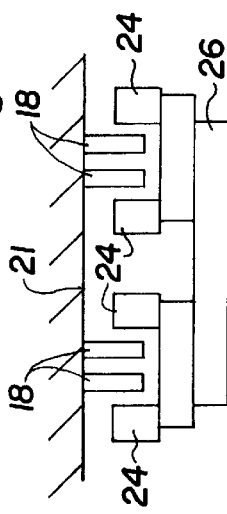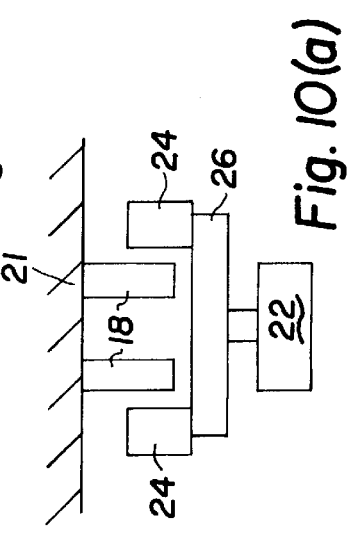

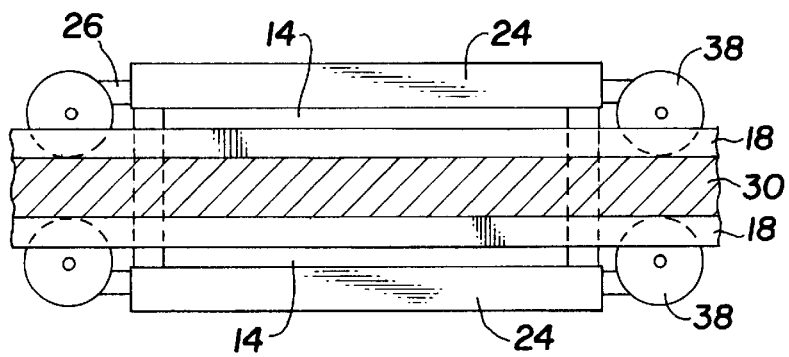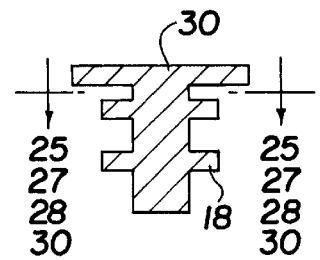
Fig. 25
Fig. 26
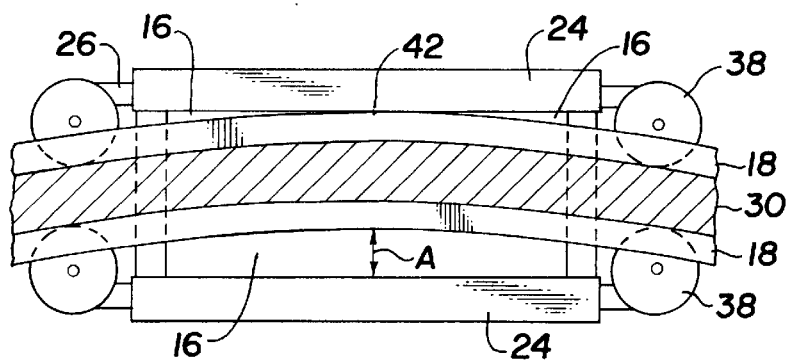
Fig. 27
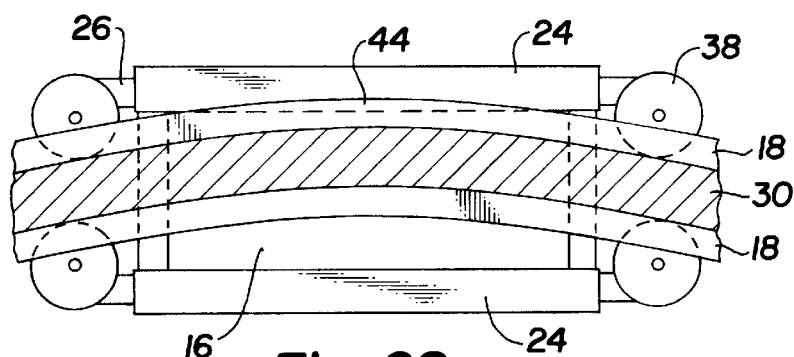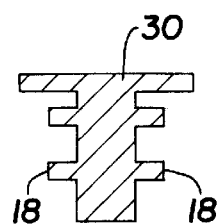
Fig. 28
Fig. 29
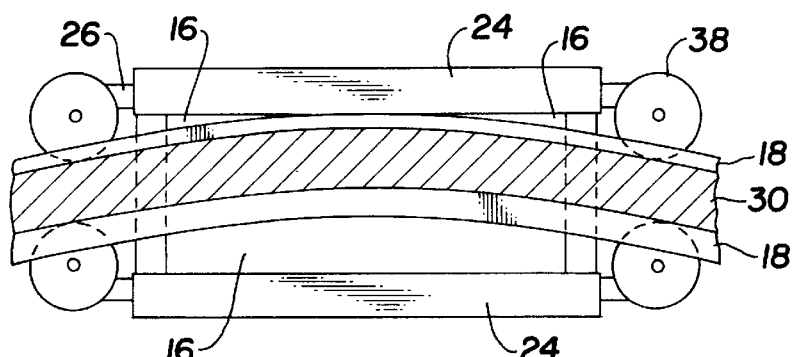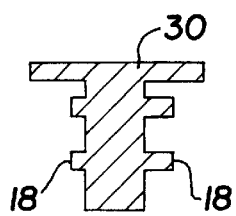
Fig. 30
Fig. 31

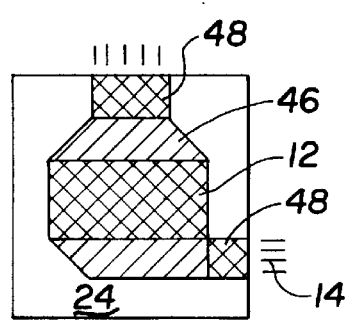
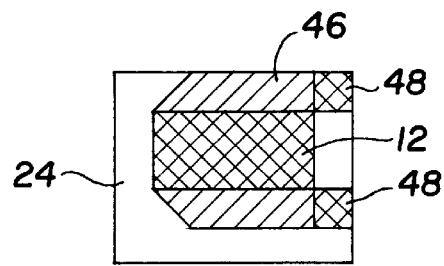
Fig. 36(a)            Fig. 36(d)
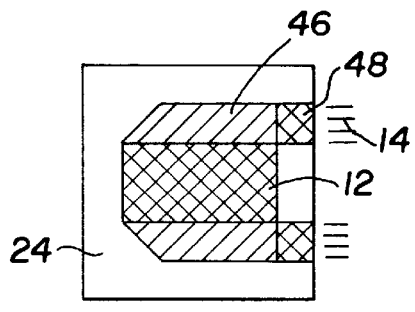
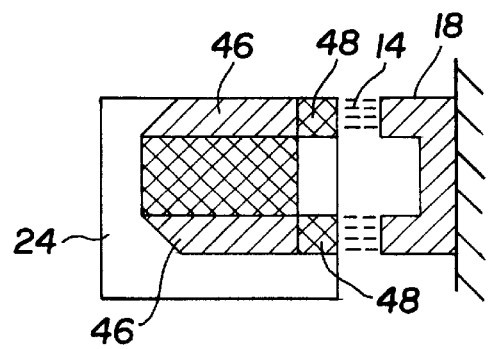
Fig. 36(b)            Fig. 36(e)
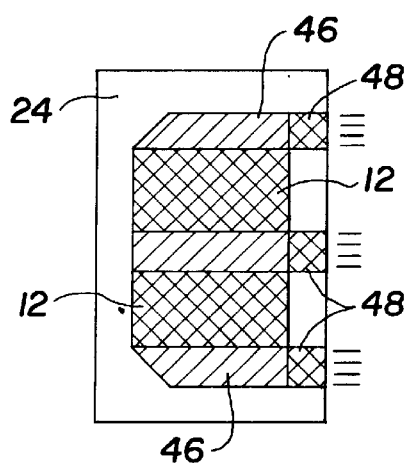
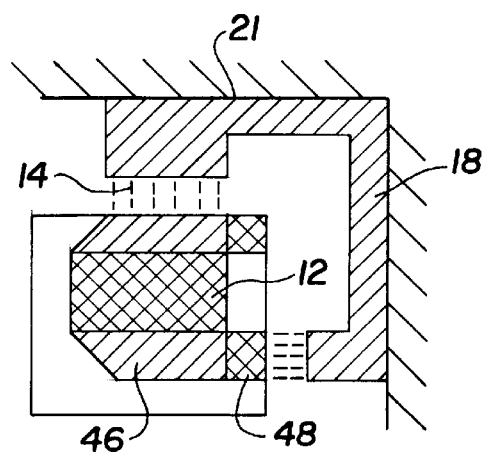
Fig. 36(c)            Fig. 36(f)

MAGNETIC LEVITATION AND SYSTEMS FOR THE SUPPORT AND CONVEYANCE OF USEFUL PAYLOADS

FIELD OF THE INVENTION

The field of art to which the invention relates comprises method and apparatus utilizing magnetic levitation in the support and conveyance of payloads.

BACKGROUND OF THE INVENTION

Magnetic levitation has long been considered useful in the support of payloads by relying on magnetic fields, rather than wheels or other known structures. It has been regarded as a viable device for unit conveying with less friction and noise than possible, for example, with wheeled vehicles. It also enables less massive guideway structures to be utilized than is attainable with wheeled vehicles resulting from a more even distribution of vehicle weight along the guideway. As a consequence, these attributes contribute to a less expensive vehicle and guideway system than is typically possible with conventional wheeled vehicles. Exemplifying use of magnetic levitation are the disclosures of U.S. Pat. Nos. 4,324,185; 4,711,182, 5,218,257, and 5,440,997.

Existing constructions have generally relied upon complex sensing and control techniques to maintain magnetic field strength at proper levels to achieve stability, and/or have resorted to superconducting electric coils for generating magnetic fields of a required strength. Guideway structures therefore have been relatively complicated with high degrees of precision. The net result has been relatively high construction and maintenance costs that consequently have limited market potential for the concept.

Despite recognition of the foregoing, a more efficient and less costly system utilizing magnetic levitation has not heretofore been known.

OBJECTS OF THE INVENTION

It is therefore an object of the invention to provide novel method and apparatus utilizing magnetic levitation in the support and conveyance of useful payloads.

It is a further object of the invention to effect the previous object utilizing magnets of unmodulated strength while operating in the attractive mode.

It is a still further object of the invention to effect the previous objects while affording vertical stability over a wide load range without depending on relatively complex sensing and control equipment for maintaining magnetic lift.

SUMMARY OF THE INVENTION

This invention relates to novel method and apparatus for supporting and conveying useful payloads via magnetic forces. More specifically, the invention relates to a system of magnetic levitation utilizing magnets of unmodulated strength and operating in the attractive mode. When operational, the system provides vertical stability over a range of loads without complex sensing and control techniques of the prior art to maintain the lift effects of the magnet field. The invention can be utilized to transport useful loads from one location to another, for support of stationary objects or both.

The foregoing is achieved in accordance with the invention utilizing magnets of unmodulated strength and arranged in a two dimensional configuration. Via an attractive interaction with corresponding array of ferromagnetic materials, stable levitation in the vertical direction is afforded able to support a range of payloads without the need for sensing or active control of the involved magnetic forces. Stability in the horizontal direction can be provided by mechanical restraint and/or magnetic forces if preferred.

As herein utilized, parallel arrays are combined into a common structure, which magnetically interacts with corresponding arrays of ferromagnetic materials. This results in a system which is stable in roll about a longitudinal horizontal axis perpendicular to the two dimensional orientation plane of the system, while concomitantly improving horizontal stability in the two dimensional plane of orientation. Stability in the horizontal direction can also be provided by an appropriate balance of attractive magnetic interactions, and may be further enhanced by either mechanical restraint, such as wheels, or by an active control of magnetic fields in this axis.

When applied to a payload to be conveyed, it becomes a transport system for movement of the payload between locations. In this arrangement, the two dimensional array of magnets are disposed in a structure for carrying the payload. The device incorporates the corresponding array of ferromagnetic materials into a guideway structure running the length of the distance over which the payload is to be conveyed.

By achieving stable levitation in the vertical axis, the principle advantages attributed to magnetic levitation as an element of a transport system are achieved. The weight of the load being transported is supported by the magnetic fields, and is distributed over the corresponding supporting guideway members. This reduces the loading concentration on the guideway, allowing for a less massive guideway structure. The achievement of stable levitation in the vertical axis also eliminates the need for a precise reference surface for measurement of vertical position. This contrasts with the prior art that used such reference surfaces for maintaining vertical position control, while reducing the degree of precision required in the construction of the guideway surface. By allowing for the use of magnets of unmodulated strength, which may be either permanent magnets or simple direct current electromagnets, using constant current, a mechanically and electrically simple levitation system results. A selective arrangement of the levitation elements can improve horizontal stability, and for vehicle positions outside the inherent horizontal stability range, can effectively reduce the loading on horizontal-restraining wheels if any. This results in horizontal-restraining wheels with minimal duty demands, compared to the demands placed on wheels used in the well known manner for supporting conventional vehicles.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIGS. 6(a), (b), and (c) schematically represent one, two, and three horizontal magnetic field sheets respectively in a class "b" support system while FIG. 6(d) graphically illustrates the vertical force characteristics thereof;

FIG. 7(a) schematically illustrates the horizontal and vertical magnetic fields of a class "a" support while FIG. 7(b) schematically illustrates the horizontal magnetic fields of class "b" support only;

FIGS. 8(a) and (b) schematically illustrate the magnetic fields of a combined system for class "a" and class "b" respectively;

FIGS. 9(a), (b) and (c) schematically illustrate an overhead supported combined class "a" system;

FIGS. 10(a), (b), and (c) schematically illustrate an overhead supported combined class "b" system;

FIG. 25 is a fragmentary schematic showing of a straight guideway in the transport system hereof as seen substantially from the position 25—25 of FIG. 26, with a levitation module present;

FIG. 26 is an end view of the guideway of FIG. 25;

FIG. 27 is a schematic showing of radius limiting geometry in a transport system hereof on a minimum radius curve as seen substantially from the position 27—27 of FIG. 26;

FIG. 28 is a top view diagrammatic showing of an unmodified minimum radius curve for the transport system hereof as seen substantially from the position 28—28 of FIG. 26;

FIG. 29 is an end view of the guideway of FIG. 28;

FIG. 30 is a top view schematic showing of modified minimum radius curve of the transport system hereof as seen substantially from the position 30—30 of FIG. 26;

FIG. 31 is an end view of the guideway of FIG. 30;

FIGS. 36(a) and (f) diagramatically illustrate forms of lift pack configurations operative in the class "a" mode while FIGS. 36(b), (c), and (e) generally illustrate lift pack configurations in a class "b" mode while FIG. 36(d) illustrates a lift pack configuration affording both class "a" and class "b" operation;

FIGS. 39(a), (b), and (c) schematically illustrate relative field patterns as a function of gap length while

DESCRIPTION OF THE PREFERRED EMBODIMENT

Figures 1A, 1B:
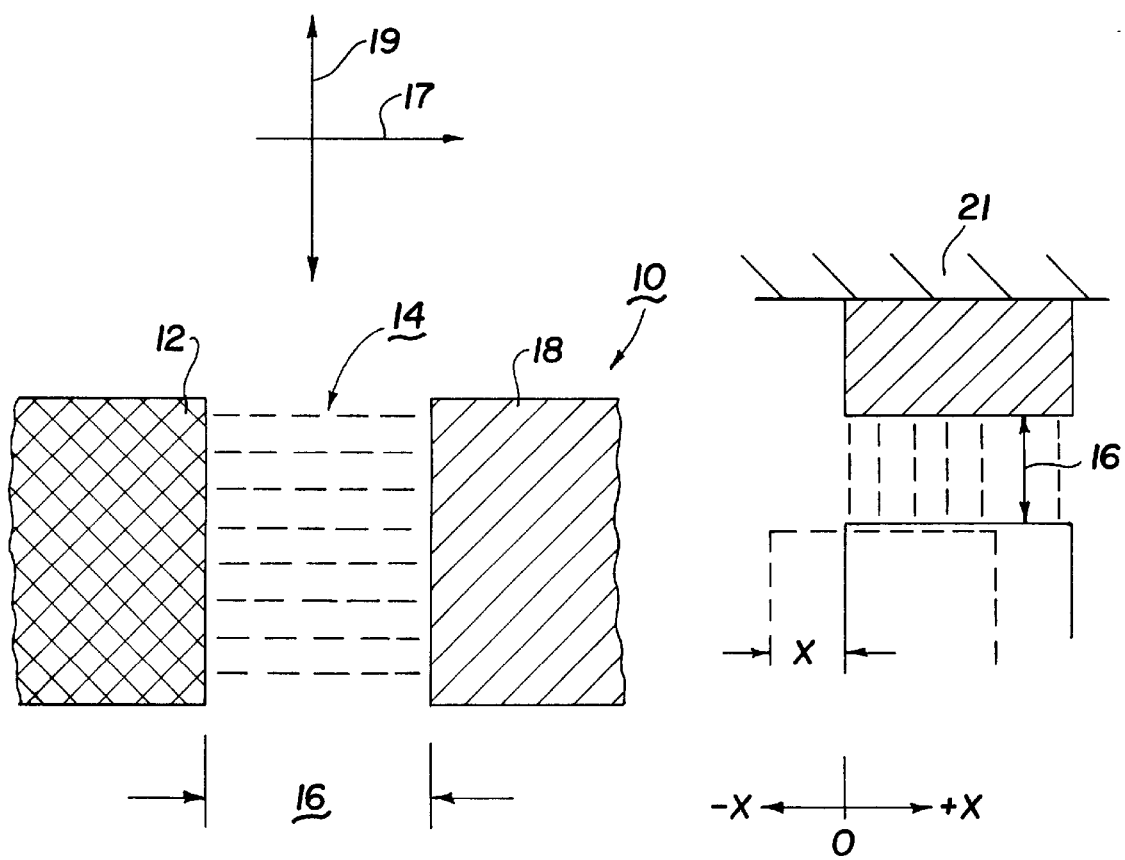
FIGS. 1(a), (b), and (c) illustrate the basic forces associated with a magnetic source and a ferromagnetic material.

In the description which follows, like parts are marked throughout the specification and drawings with the same reference numerals respectively. The drawing figures are not necessarily to scale and in certain views, parts may have been exaggerated for purposes of clarity.

Figure 1C:
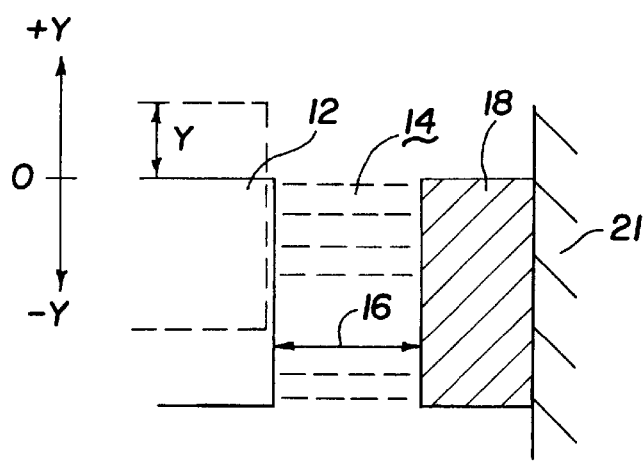
Figure 2A:
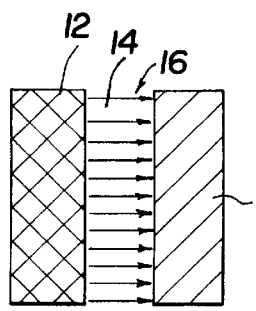
FIGS. 2(a), (b), and (c) schematically illustrate the effect on magnetic field configuration as caused by misalignment between the magnetic source and the ferromagnetic material.
Figure 2B:
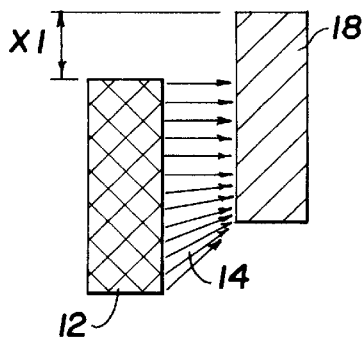
Figure 2C:
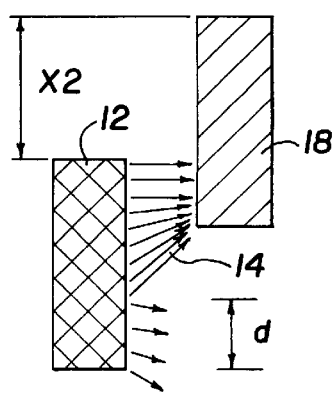
Figure 3A:
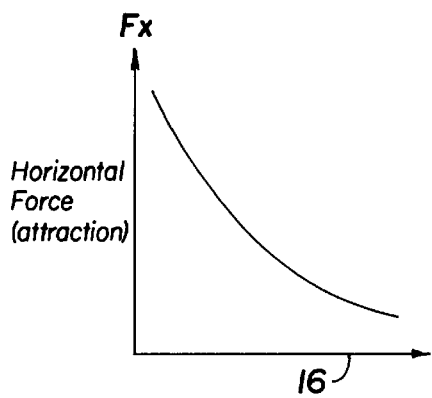
FIGS. 3(a), and (b), graphically represent the horizontal attraction force and vertical restoration force of a horizontally oriented magnetic field.
Figure 3B:
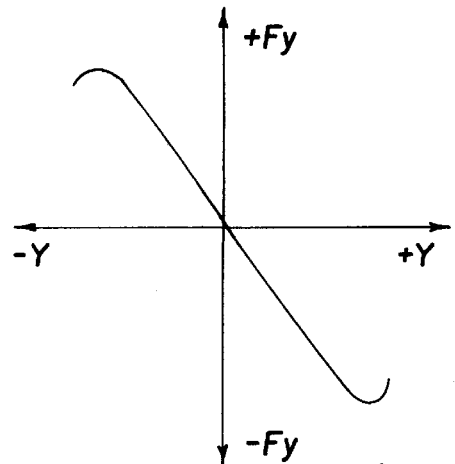

Referring now to the drawings, there is illustrated in FIGS. 1–3 an inherent stability achieved in the vertical axis of a magnetic field using a two dimensional array of magnet sources of unmodulated strength, resulting in a system 10 capable of supporting a payload of varying weight. FIG. 1 illustrates a two dimensional magnetic source 12, generating a magnetic field sheet 14 crossing an air gap 16 to a ferromagnetic material 18. For purposes hereof, the configuration of the magnetic field sheet is planar, aligned perpendicularly to the two dimensional orientation of the magnetic source 12. Interaction of the magnetic field sheet 14 with the ferromagnetic material 18 gives rise to two forces including a first force, designated 17, acting parallel to the direction of the field. It attempts to cause magnetic source 12 and ferromagnetic material 18 to approach and thereby alter the air gap 16. This force increases in strength as the air gap reduces causing magnetic source 12 and the ferromagnetic material 18 to increasingly approach each other more closely. The parallel force consequently produces an unstable effect causing the force level to increase further as the gap reduces thereby increasing the effect.

A second force, designated 19, acts in the two dimensional plane of orientation, perpendicularly or normal to the direction of field 14. This force is zero when poles of magnetic source 12 and ferromagnetic material 18 are aligned laterally and appears as they become misaligned as best seen in FIGS. 1 and 2. Further misalignment causes the second force to increase up to a degree of misalignment where the effect of this force begins to diminish. Perpendicular force 19 acts in a manner as to oppose misalignment of the poles between magnetic source 12 and the ferromagnetic material 18 so as to produce a stable effect attempting to return the misaligned elements to an aligned relation.

Figure 4A:
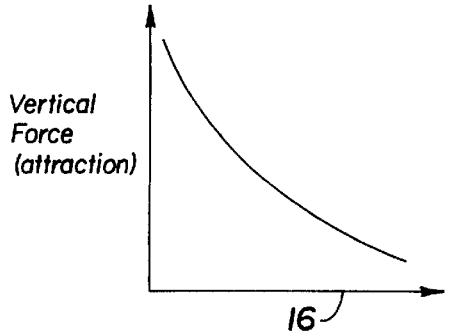
FIGS. 4(a) and (b) graphically represent the vertical attraction force and horizontal restoration force of a vertically oriented magnetic field.
Figure 4B:
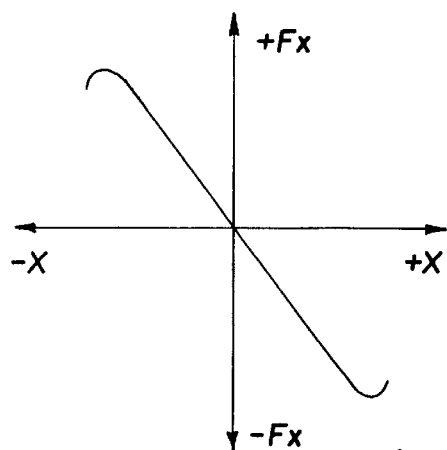

The above effects for a two dimensional magnetic field sheet oriented vertically are graphically represented in FIGS. 4(a) and (b). As illustrated in FIG. 1(b), the ferromagnetic material is attached to a fixed surface 21 and the magnetic source is displace able. When magnetic source 12 moves vertically closer to the ferromagnetic material, the size of air gap 16 decreases (i.e., moves upward) and the attractive effect of the parallel force 17 increases. Opposite movement in the form of increased separation effects an opposite result in that moving the magnetic source away from the ferromagnetic material increases the air gap, causing attraction of parallel force 17 to decrease. Where the magnetic poles and ferromagnetic material 18 are aligned perpendicularly, (i.e., horizontal) force 19 ceases to exist. If the magnetic source moves perpendicularly to the orientation of the field (i.e., moves horizontally) in the two dimensional plane of orientation, causing misalignment between the magnetic source 12 and the ferromagnetic material by an amount "x", the perpendicular force 19 appears, effective in the horizontal direction in attempting to restore the alignment. The restoration strength increases, up to a point where the misalignment is excessive causing perpendicular force 19 to diminish. The net effects are essentially the same if the magnetic source and the ferromagnetic material are interchanged with the latter being displaceable.

FIGS. 3(a) and (b) illustrate these effects for a two dimensional magnetic field sheet oriented horizontally. Here, the ferromagnetic material 18 is assumed to be attached to a fixed surface 21 and the magnetic source 12 is displaceable. When the magnetic source displaces horizontally to approach the ferromagnetic material, it decreases the size of the air gap, urging the attractive parallel force, acting in the horizontal direction to increase. The smaller the gap, the greater the attractive effect of the parallel force. On the other hand, increasing the gap size diminishes attractive effect. When misalignment in the vertical direction occur by an amount "y", a vertically-acting perpendicular force is generated causing restoration toward alignment. The effect of this force likewise increases with misalignment until the misalignment becomes so excessive as to cause the perpendicular force to diminish. The net effects are essentially the same if the magnetic source 12 and the ferromagnetic material 18 are interchanged with the latter being displaceable.

Figure 5C:
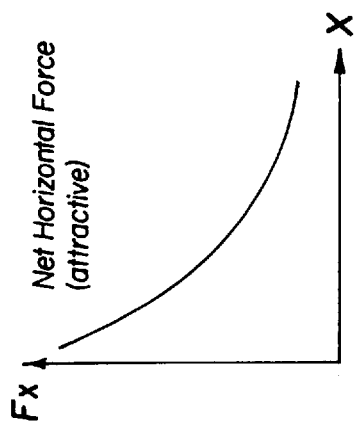
FIGS. 5(a), (b), and (c) schematically and graphically illustrate a class "a" support system with FIGS. 5(d) and 5(e) representing the net combined vertical forces and variation effect between vertically oriented and horizontally oriented field strengths.

With reference to FIG. 5, the above effects are applied to a support system for the vertical support of a payload 22. The support system is capable of supporting a desired payload, of varying weights, without the necessity of continuously monitoring conditions related to the support function, or to continuously modulate the strengths of the magnetic forces providing the vertical lift for support. The reasons for this absence of controls will be understood.

Typically such support systems include a class "a" support system utilizing a combination of horizontally and vertically oriented two dimensional magnetic field sheets as exemplified by FIG. 5 or a class "b" system utilizing only horizontally oriented two dimensional magnetic field sheets as exemplified by FIG. 6.

As shown in FIG. 5, two normally oriented magnetic sources 12 contained in an assembly hereinafter referred to as a "liftpack" 24, generate two dimensional magnetic field sheets 14, one oriented in the vertical direction and the other in the horizontal direction. These vertical and horizontal field sheets interact with corresponding surfaces of complementary ferromagnetic materials 18. As shown in FIG. 5, an array of ferromagnetic materials 18 is attached to a fixed surface 21, and the liftpack 24 is allowed to displace vertically while restrained from displacing horizontally.

Figure 5B:
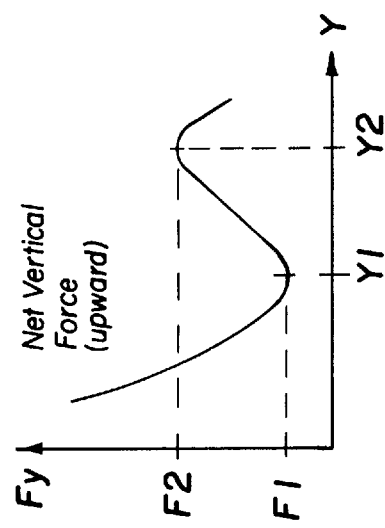
Figure 5A:
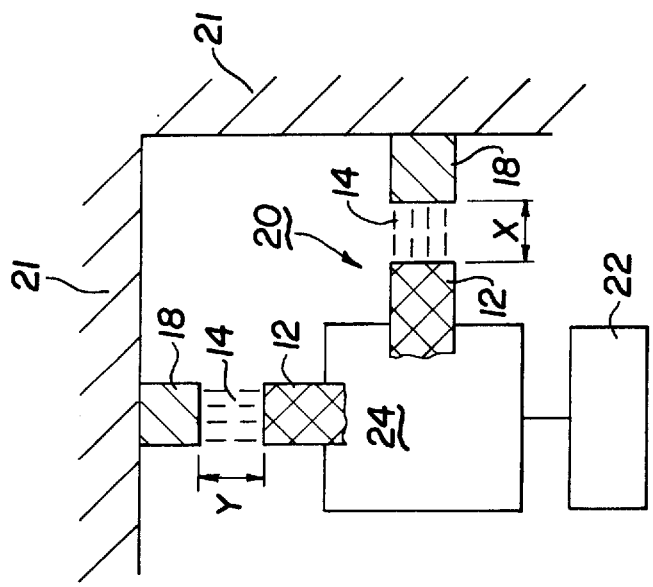

At a vertical position Y1 of FIG. 5(b), a net upward force F1 exists. As Y is displaced either up or down, the upward vertical force is caused to increase. Where displacement of Y to values less than Y1 (i.e., further upward), the net vertical upward force continually increases. As Y moves to values larger than Y1 (i.e., further downward), the vertical upward force increases until reaching a value of F2, beyond which the force F decreases as Y is increased further. Within the range of vertical distance between Y1 and Y2, there is represented a range of vertical stability. At values of vertical distance less than Y1, the upward force increases with decreased distance tending to cause a "clamp up" of the device at the vertical fixed surface pole piece. Conversely, at vertical distances greater than Y2 the upward force diminishes with increasing distance and could, if not otherwise provided for, allow load 22 to descend. Likewise, forces F1 and F2 represent the dynamic range of weights that may be stably supported by the support system of this class. For a combined payload and liftpack weight of less than F1, the vertical forces could overwhelm the weight and cause the device to clamp up. For combined weights greater than F2, the vertical forces are insufficient to provide support and the liftpack/payload could likewise be caused to descend. For combined weights between F1 and F2, stable levitation occurs and payload 22 is supported.

The vertical force characteristics of the class "a" system illustrated in FIG. 5 are generated by the combination weight of the liftpack 24 and payload 22 acting with gravity to urge the liftpack downward. Should this movement cause the horizontal field to become misaligned such that the pole of the liftpack lies vertically below its corresponding pole of ferromagnetic material array 18, a perpendicular force 19 related to that field will attempt restoration of the liftpack upward. This force will increase in strength as the liftpack descends further, and conversely will diminish as the liftpack ascends back toward alignment with the surface array of ferromagnetic material 18.

The interaction of the vertically aligned magnetic field with its corresponding elements of ferromagnetic materials also generates a vertical force 19 accompanying its parallel force, acting in an upward direction. This force decreases as the liftpack descends, and conversely increases as the liftpack ascends.

The two vertically acting forces, being the perpendicular force from the horizontal field and the parallel force from the vertical field, acting together result in a net combined vertical force, as represented in FIG. 5(d) that act to offset any downward pull of the weights of liftpack 24 and payload 22. Where the blend of vertical and horizontal fields is satisfactory, the liftpack and payload achieve a position of vertically stable equilibrium. Should the unit descend further downward, the net upward force increases, causing the unit to return upward to its position of stability. If it rises above the stability level, the net upward force reduces to less than the weight, allowing the unit to descend back to its stability level.

A proper choice of vertical and horizontal magnetic force effects ensure that the upward effect of the parallel force of the vertical field does not overpower the downward effect of the perpendicular force 19 of the horizontal field as the unit rises. Yet it provides a useful addition to the upward effect of the perpendicular force of the horizontal field even as the load descends further. In essence, the perpendicular force of the horizontal field provides stability in the vertical direction, while the parallel force of the vertical field provides a boost in total load carrying capability of the unit. The relative locations of magnets 12 and ferromagnetic materials 18 in FIG. 5(a) could be interchanged between the liftpack and fixed surface with the ferromagnetic materials incurring the displacement. The same principles would apply, and the net effect is the same. This arrangement is suitable for the stationary support of a payload 22, or for a payload to be conveyed over a short distance. It is less desirable, however, for conveying a payload over a considerable distance from one location to another, in that the latter requires the entire length of the fixed surface be provided with magnetic sources, tending to increase cost per unit of distance.

FIG. 5(e) illustrates the relationship of varying the effect of the vertically-oriented magnetic field relative to that of the horizontally-oriented field. It can be seen that as the effect of the vertical field is increased, the net upward vertical force increases, but the range of vertical lift over which the device is stable is reduced. That is, with a stronger vertical field it can carry a heavier load, but it cannot effectively carry a light load. As illustrated, forces F1 and F2 represent the dynamic range for the case of a relatively stronger vertical field, while forces F3 and F4 represent the dynamic range for a relatively weaker vertical field. The maximum force for the stronger vertical field, F1, exceeds that of the weaker vertical field, F3. However, the differential between F1 and F2, the dynamic range for the stronger vertical field, is less than that between F3 and F4, the dynamic range for the weaker vertical field. Thus, the vertically and the horizontally oriented magnetic field effects must be properly matched, according to the range of loads intended to be supported, in order to achieve satisfactory performance of this class of device.

FIG. 6 illustrates the case for a class "b" support system. All of the magnetic field sheets in this system are oriented horizontally, without any vertically oriented fields being present. Alternative subsets FIGS. 6(a), (b), and (c), includes one, two or three distinct horizontal magnetic field sheets respectively generated by the liftpack 24. As illustrated, the surface arrays of ferromagnetic materials 18 are attached to a fixed surface. The liftpack 24, allowed to displace vertically but restrained horizontally, receives payload 22. As with the class "a" system described supra, this arrangement could be interchanged, with the magnetic sources 12 attached to a fixed surface and the array of ferromagnetic materials 18 allowed to displace vertically while supporting payload 22. As with class "a", however, this arrangement is most satisfactory for a stationary support, and less desireable for conveying a payload over a considerable distance.

The class "b" systems possess vertical stability, but in contrast to the class "a" configurations, they are not subject to a minimum allowable weight for maintaining vertical stability. That is, since there is no vertical force associated with a vertically oriented magnetic field in the class "b" system, it cannot incur an increasing upward vertical force to overwhelm the inherently stable vertical forces associated with the horizontally oriented magnetic field and thereby cause the device to clamp up. The dynamic range of weights that this class of device may support spans from zero to a maximum value, which vary with the particulars of a selected design.

A liftpack 24 combining the capabilities of operating in either a class "a" or class "b" support configuration is best illustrated in FIG. 7. In this arrangement, the liftpack 24 is capable of generating both vertically and horizontally oriented fields. According to the configuration of the array of ferromagnetic surfaces 18 with which the magnetic fields interact, the support mode is rendered either class "a" or "b". When both horizontally oriented but without vertically oriented array elements present, the device functions as a class "b" support. When both vertical and horizontal elements of the array are present, it operates as a class "a" device.

The arrangements thus described in conjunction with FIGS. 5 and 6, possess stability in the vertical direction. If not otherwise precluded however, they could potentially prove unstable both in roll about a horizontal axis perpendicular to the two dimensional plane of orientation, and in the horizontal direction in the two dimensional plane of orientation. To assure stability in the roll axis while improving horizontal stability, two or more such units of either of these arrangements can be operative in parallel rows, in the manner best illustrated in FIG. 8, and hereinafter referred to as a "Combined System". Again, either the array of ferromagnetic surfaces 18, or the liftpacks 24, are attached to a fixed surface 21. The other, whether the ferromagnetic surface array or the liftpacks, are incorporated into a structure herein referred to as a "levitation module" 26, which is free to displace vertically. The levitation module, being supported vertically by the magnetic forces between itself and a fixed surface 21 (i.e., a guideway), as discussed supra, and being free to be conveyed along the direction of a guideway, can comprise the payload of the invention as will be understood.

Payload 22 is supported by the levitation module 26. The configuration shown in FIG. 8 illustrates both the class "a" and class "b" alternatives of support, i.e., with a combination of horizontal and vertical oriented magnetic field sheets FIG. 8(a), and only horizontal oriented magnetic field sheets FIG. 8(b). The arrays of ferromagnetic surfaces 18 are attached to the fixed surface 21 while the liftpacks 24 are attached to displaceable levitation module 26.

The essence of the FIG. 8 arrangements are that the liftpacks 24 in one parallel row are arrayed such that the attractive directions of the parallel forces of their horizontally oriented magnetic field sheets oppose those of the other parallel row. When more than two parallel rows of liftpacks are utilized, they are arrayed such that the net result of their individual horizontal forces tend to balance in a direction of action. In this manner, any horizontal instability associated with one liftpack is largely reduced by the opposing action of the other parallel liftpack. Also, with this arrangement, any tendency of levitation module 26 to roll manifests itself as vertical movement in the other of the parallel rows of lift packs. Since they are inherently stable vertically, they will resist this tendency and hence enjoy roll stability.

When the liftpack arrays 24 of FIG. 8 are perfectly centered horizontally relative to their respective arrays of ferromagnetic surfaces 18, the parallel forces from each of the opposing horizontal fields are equal and opposite. Should levitation module 26 become displaced horizontally toward one side or the other, for whatever reason, some of the horizontal field air gaps will diminish in size and others will increase correspondingly. The horizontal forces will consequently increase in the diminished gaps and decrease in the lengthened gaps, causing a net horizontal force tending to further displace the unit in that direction. This force will be less, however, than would be the case for a single unit acting alone, since it is countered by the diminished but still present counterforce of the lengthened gaps.

As levitation module 26 displaces horizontally to one side, however, perpendicular forces associated with the vertically oriented fields begin to build up and act to oppose the displacement in the manner of FIG. 5. These, in combination with the counterforce of the lengthened gap, contribute to reducing the net horizontal force. With the proper blend of magnetic forces from the vertically and horizontally oriented fields, the combination results in inherent horizontal stability over a limited range of horizontal position. Beyond this range, the system could potentially be horizontally unstable, due to a rapid buildup rate of the unbalanced horizontal forces. Moreover, if other considerations require a blend of vertically and horizontally oriented magnetic fields that do not provide a sufficient range of inherent horizontal stability, then the levitation module could potentially be horizontally unstable over part or all its intended entire range of horizontal motion. In the event such horizontal instability occurs, a horizontal control can be utilized to mitigate this effect. Numerous control options exist for this item, ranging from physical restraint, such as horizontally restraining guide wheels, to active control of the horizontal magnetic fields by a modulation mechanism.

Figure 11A:
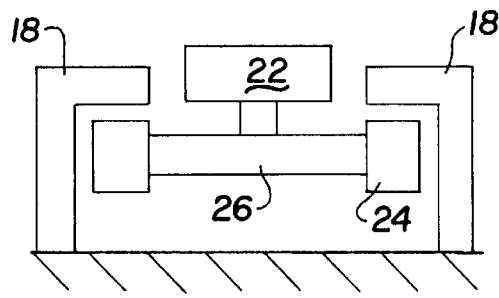
FIGS. 11(a), (b), and (c) schematically illustrate an underneath supported combined class "a" system.
Figure 12A:
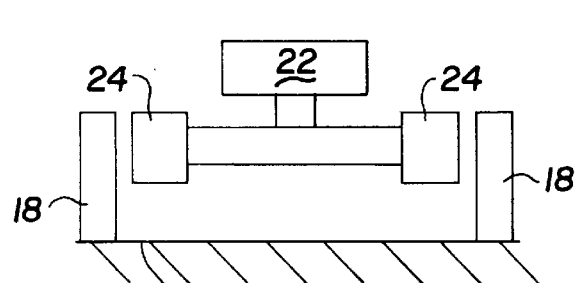
FIGS. 12(a), (b), and (c) schematically illustrate an underneath supported combined class "b" system.
Figure 11B:
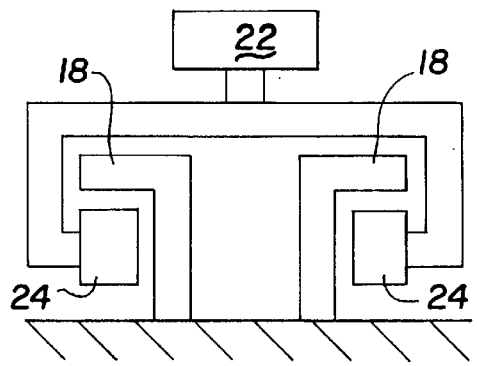
Figure 12B:
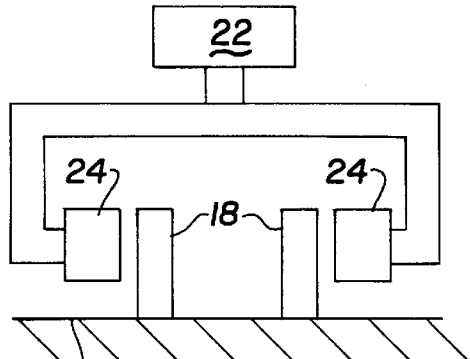
Figure 11C:
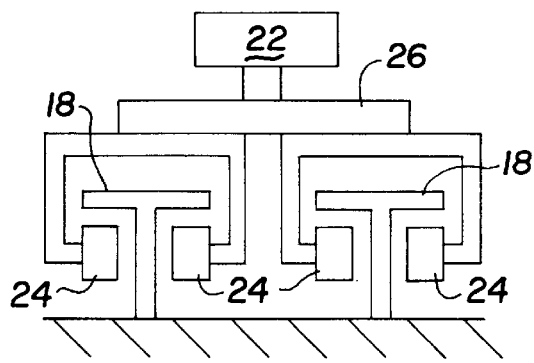
Figure 12C:
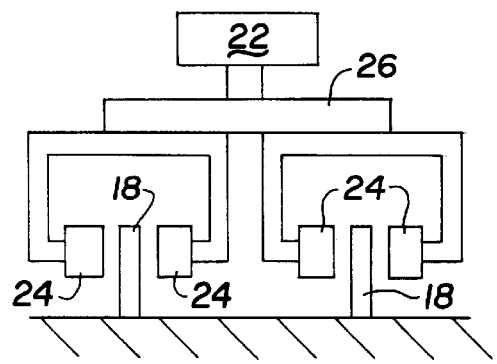
Figure 13A:
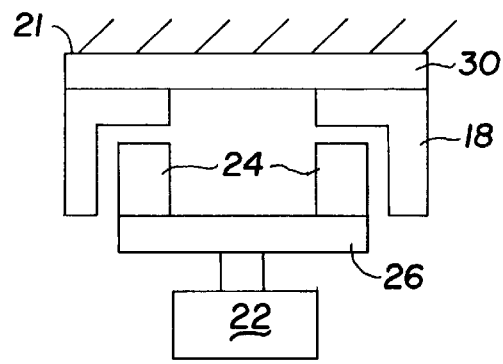
FIGS. 13(a), (b), (c), (d), (e) and (f) schematically illustrate the basic components of a transport system in accordance herewith.
Figures 13B, 13C:
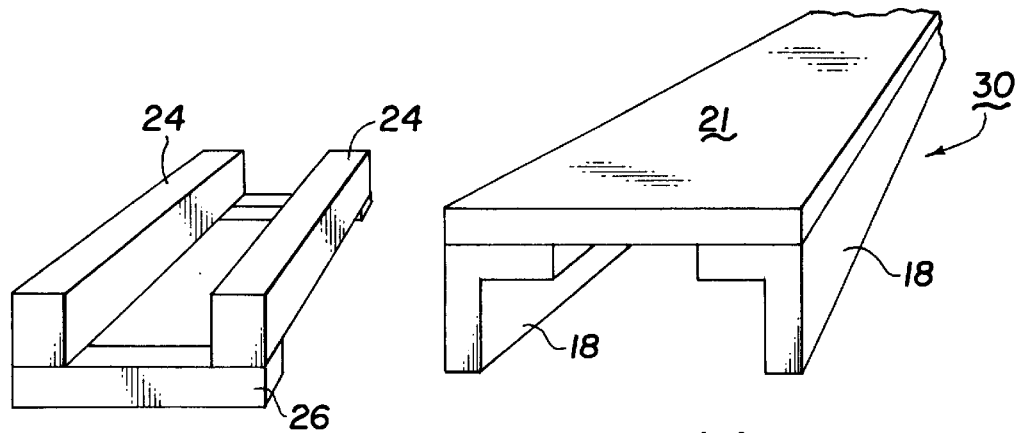
Figures 13D, 13E, 13F:
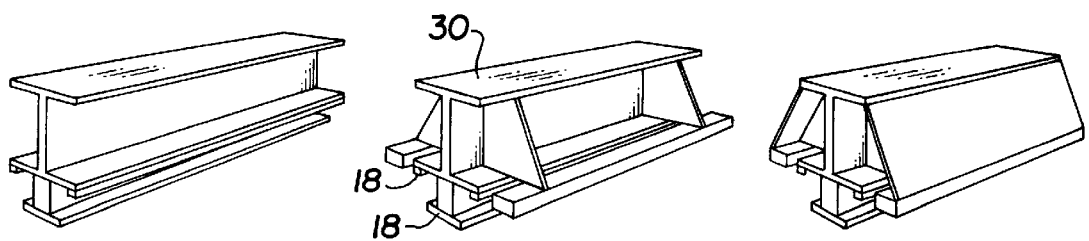

With reference to FIGS. 9–12, two general categories of support are possible with the Combined System, including:

1) a levitation module 26 and payload 22 all supported from overhead while, being suspended beneath the fixed surface 21 (FIGS. 9 and 10); and 2) a levitation module 26 and payload 21 supported from below, while located over the fixed surface 21 (FIGS. 11 and 12). As illustrated FIGS. 9 and 11 represent a class "a" system whereas FIGS. 10 and 12 represent class a "b" system.

A transport system, designated 27, for displacement or conveyance of a payload 22 from one location to another is illustrated in FIGS. 13–23. The elements of transport 27 system are illustrated schematically in FIG. 13 and are comprised of a cargo or payload 22 being conveyed (FIG. 13a), in the form of a carrier 28 (FIG. 14) serving to support or contain cargo 22 attached to levitation module 26. The latter generates the magnetic fields providing vertical support afforded by guideway 30, a superstructure 32 (FIG. 14) supporting the guideway, and vertical supports 34 affording support for the super structure.

Both class "a" systems employing both horizontally and vertically oriented magnetic field sheets, and class "b" systems employing only horizontally oriented magnetic field sheets, are applicable to this function. As with the combined system described supra, the transport system 27 can be configured either so that the levitation module 26 and payload 22 are supported from overhead, suspended beneath the fixed surface 21, or from below located over the fixed surface 21. Advantages for this transport arrangement includes reduced friction with consequent reduced wear of both trackway and vehicle, compared to conventional transport technologies utilizing wheels for support of a payload.

For maximum efficiency it is preferred that liftpacks 24 be mounted on the levitation module 26, and the arrays of ferromagnetic surfaces 18 be attached to fixed surface 21. This combination of fixed surface 21 and attached array of ferromagnetic surfaces 18, form guideway 30, that extends longitudinally, generally in a horizontal plane, in a direction perpendicular to the two dimensional plane of system orientation for the entire distance over which transport is to occur. The guideway, although generally horizontal, may contain such straight horizontal and gradient segments and horizontal and vertical curves as are necessary to traverse a path of transport to be described.

Levitation module 26 may contain components for braking and propulsion to be described, which provide the transport propulsion and braking for the payload from one location to another, travelling along the guideway in a longitudinal direction. It is of a longitudinal length as required to provide the necessary vertical lift to support the desired payload and may be a single unit, or more than one unit arranged longitudinally and connected together in tandem, as desired, in order to obtain a necessary length.

In order to protect against the possibility of a levitation module 26 incurring an undesirable descent from guideway 30, whether it be supported from overhead or from below, it is provided as a safety precaution with positive structure for vertical entrapment. In the case of a class "a" support configuration, wherein vertical magnetic forces are utilized for some of the support function, it is desirable to provide a positive protection against the system clamping up. In accordance herewith, these features are afforded by wheels 36, (FIG. 21) affixed to either levitation module 26 or to the guideway 30, not normally making contact between them but oriented and available to oppose a roll or undesirable descent in the event they become needed in the course of travel. Such wheels are arranged so that their axles are horizontal, and perpendicular to the longitudinal direction of travel.

Horizontal stability is desirable, and may be provided by positive horizontal entrapment, in the two dimensional plane of orientation, to protect levitation module 26 against undesirable descent from guideway 30. It can also afford steering for levitation module 26 as it traverses guideway 30 and comprises a set of wheels 38, (FIG. 19) mounted via wheelstalks 39 to either the levitation module or the guideway, with axles oriented vertically. If used for horizontal stability and/or steering, the wheels can be in constant contact between the levitation module and the guideway. In that arrangement, the wheels will be lightly loaded on straight runs, lacking curves, with the levitation module substantially centered horizontally with respect to the array of ferromagnetic surfaces on the guideway. Other horizontal forces could, however, be encountered such as side wind loads but typically cause minimal wear on the wheels.

Figure 14A:
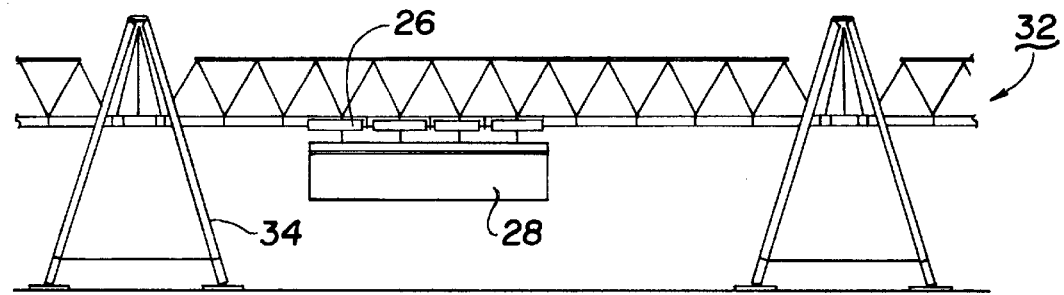
FIGS. 14(a), (b), (c), (d) and (e) schematically illustrate the application of a transport system utilizing the components of FIG. 13.
Figure 14B:
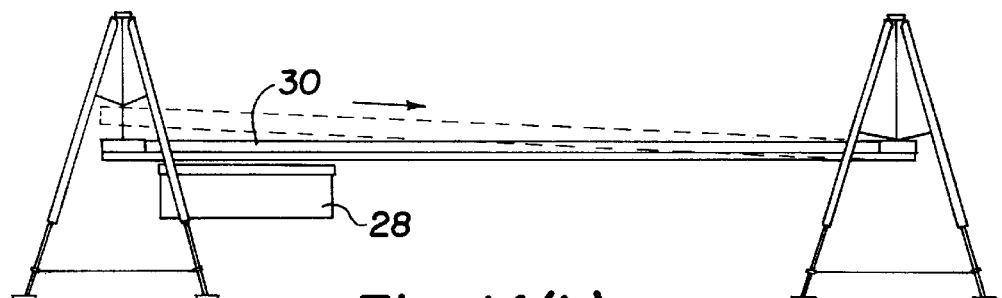
Figure 14C:
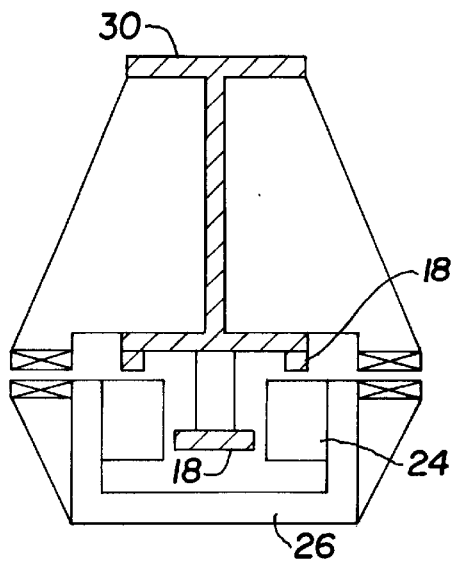
Figure 14D:
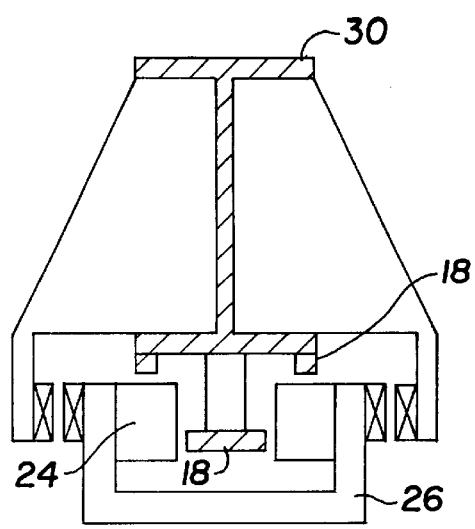
Figure 14E:
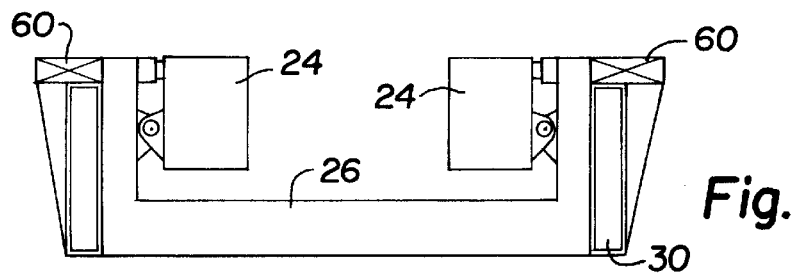
Figure 15:
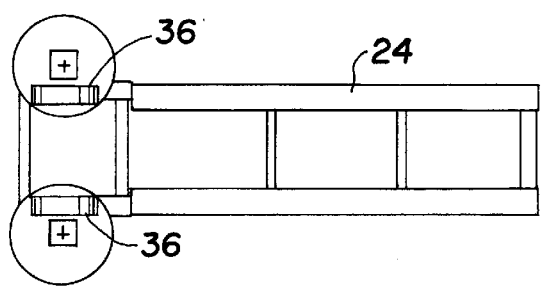
FIG. 15 schematically illustrates a top plan view of a levitation module utilizing the transport system of FIG. 14.
Figure 17:
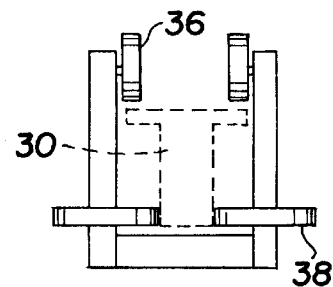
FIG. 17 is an end view as seen substantially from the position 17—17 of FIG. 16.
Figure 16:
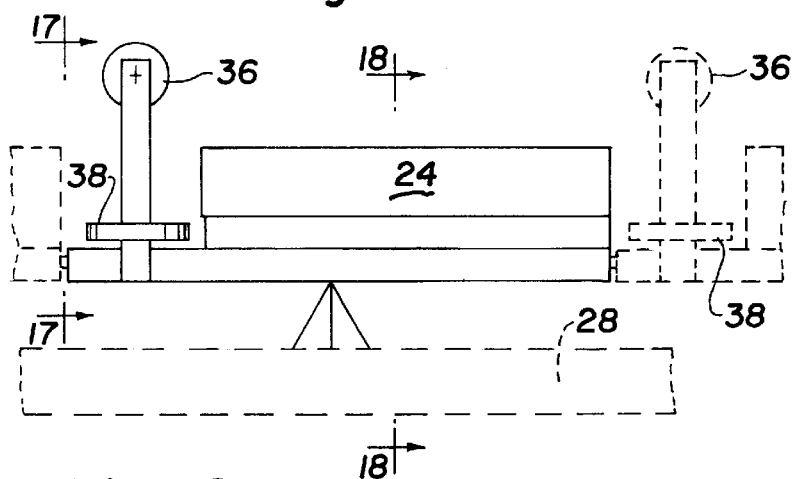
FIG. 16 is a vertical elevation of the levitation module of FIG. 15.
Figure 18:
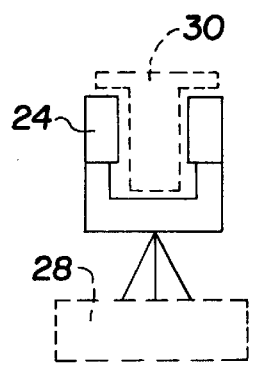
FIG. 18 is a sectional view as seen substantially from the position 18—18 of FIG. 16.
Figure 19:
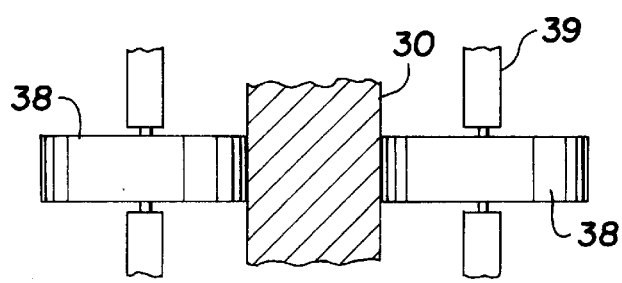
FIG. 19 is a fragmentary end view of a guideway inner face of a first embodiment levitation module hereof, illustrating the relationship between horizontal guidewheels and a guideway.
Figure 20:
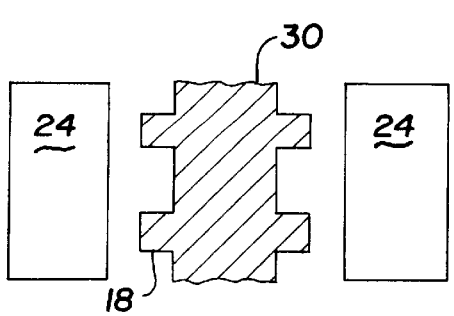
FIG. 20 is a fragmentary end of view a guideway inner face of a second levitation module hereof, illustrating the relationship between magnetic source liftpacks and a guideway.
Figure 21:
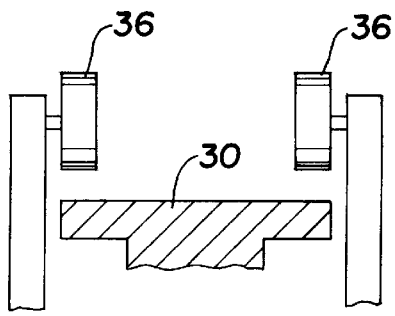
FIG. 21 is a fragmentary end view of a guideway inner face of a third embodiment levitation module hereof, illustrating the relationship between vertical support wheels and a guideway.
Figure 22:
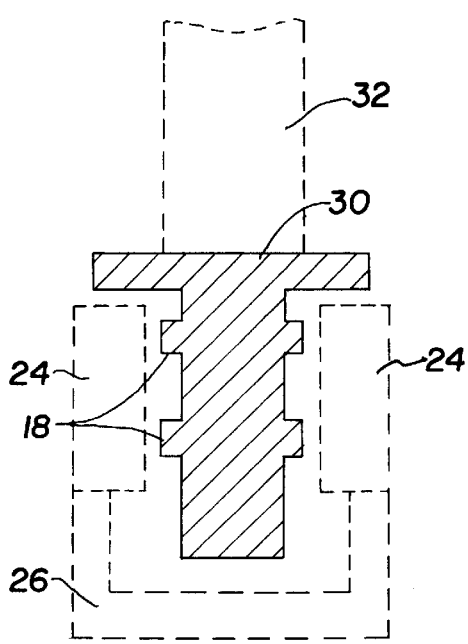
FIG. 22 is a fragmentary end view of a guideway lift pack arrangement of a levitation module hereof.
Figure 23:
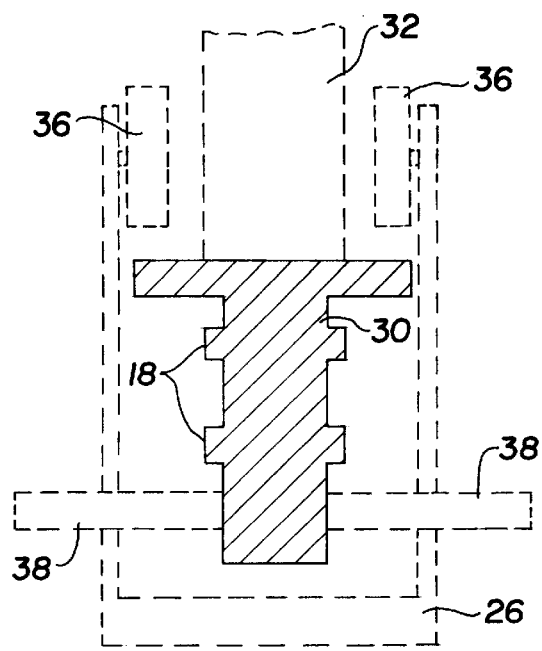
FIG. 23 is a fragmentary end view with wheelstalk of a levitation module hereof.

Propelling levitation module 26 along a guideway 30 can be provided by various types of known propulsive devices, such as linear electric motors 60 (FIG. 14(e)) or reaction devices that may be mounted on the levitation module and/or on guideway. Such devices do not require physical contact between the levitation module and guideway, thereby eliminating friction normally associated with conventional, traction based propulsion techniques. Propulsion may also be achieved by the conversion of gravitational potential energy into kinetic energy of motion by traversing the levitation module downward through a sloping gradient on the guideway. In a preferred embodiment there is included a propulsion device in the form of a linear electric motor 60 that operates via electric power either generated on board the levitation module or supplied to the guideway from wayside sources.

Figure 24A:
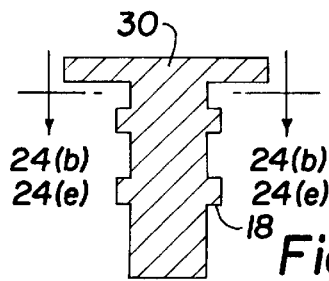
FIGS. 24(a), (b), (c), (d) and (e) are fragmentary schematic showings of intermittent propulsion in the transport system hereof using gap variations with FIG. 24(a) being an end view of a cross section of guideway.
Figure 24C:
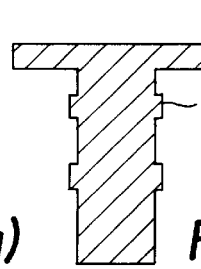
FIGS. 24(c) and (d) being end views of cross sections of guideway as seen substantially from positions 24(c)—24(c) and 24(d)—24(d), respectively, of FIG. 24(b)
Figure 24D:
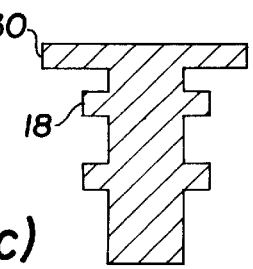
FIG. 24(b) being a top plan section of guideway as seen substantially from the position 24(b)—24(b) of FIG. 24(a)
FIG. 24(e) being a top plan section of guideway as seen substantially from the position 24(e)—24(e) of FIG. 24(b), with the levitation module present.
Figure 24B:
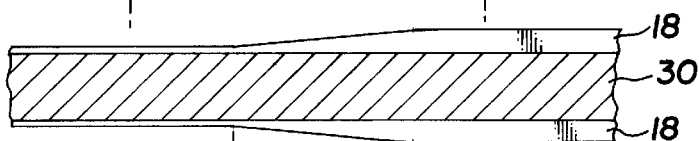
Figure 24E:
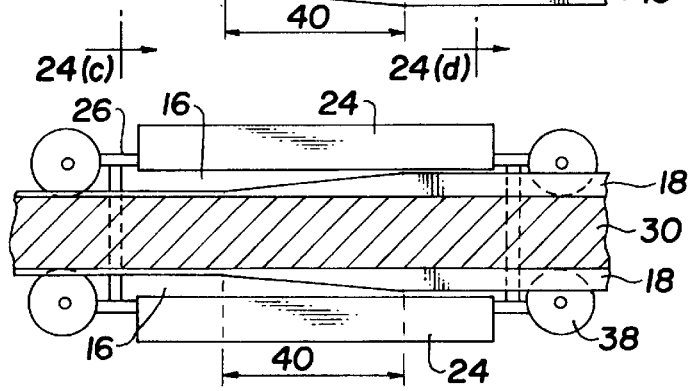

In accordance herewith, propulsion can be enhanced over short guideway distances, by progressive longitudinal reduction of gap sizes for some or all of the physical gaps separating the lift packs 24 from their corresponding elements on the guideway arrays of ferromagnetic surfaces 18. This can be achieved by progressively increasing thickness of ferromagnetic surfaces 18 in a gap reduction zone 40 (FIG. 24(b)). Such reduction gives rise to magnetic forces associated with the respective magnetic field sheets, acting in the reduction direction and tending to accelerate the levitation module further in that direction. This technique, illustrated in FIGS. 24, may be utilized in gap reduction zone 40 for boosting acceleration of the levitation module on start-up from specific locations along the guideway designated as stopping points, or for providing enhanced propulsive effect at certain designated portions of the guideway. On the other hand, retardation or slowing of the levitation module is achieved, when desired for braking or speed control, by a reversal of the acceleration effects described above, including increasing selected air gap distances at designated locations. Additionally, retardation can be achieved by utilizing conventional frictional braking devices, attached to either the levitation module 26 or to the guideway 30, causing a frictional contact between the two.

For enhancing usefulness of the transport system hereof there is provided utilization of small radius horizontal curves that may occur along the guideway and in guideway switches as can best be understood with reference to FIGS. 25–31. Physical clearances between the ferromagnetic surfaces 18 interacting with the horizontally oriented magnetic fields 14 generated by liftpacks 24 and their surfaces are preferably minimized. This tends to minimize the air gap and thereby increase the ability of the magnetic sources 12 in the liftpacks 24 to generate magnetic fields 14 across these gaps of maximal value, and consequently create maximum strength for support. In traversing straight segments of the guideway, such air gaps can be of relatively small size.

FIG. 25 illustrates a straight guideway past which the levitation module 26 can traverse a horizontally curved segment of guideway (FIG. 27). The surfaces of the straight and rigid liftpacks facing towards the curve center will, in their longitudinally central portions, experience a reduced horizontal magnetic field air gap distance. At a certain radius of horizontal guideway curvature, that will vary with design, the reduced air gap will essentially vanish, i.e., the surface of the liftpack and its corresponding element of ferromagnetic material on the guideway could potentially incur physical contact at interference point 42. (FIG. 27) Conversely, the opposite surfaces of the liftpacks facing outward will, in their longitudinally central portions, experience a larger air gap distance "A". As the increase in air gap increases further, it diminishes the ability of that horizontally oriented field to generate useful vertical support. These effects serve to limit the minimum radius of horizontal curvature of the guideway that the levitation module can successfully traverse.

For overcoming the above limitations to increase the air gap on the surface of the liftpacks where it would normally experience a decrease, dimensional adjustment of the corresponding elements of the ferromagnetic surface array on the guideway is utilized through an interference zone 44. (FIG. 28) Alternatively, elements of the ferromagnetic surfaces on the guideway can be eliminated completely through such zone. Reductions in vertical support normally provided by the magnetic forces associated with the horizontally oriented magnetic field sheets can be compensated for by wheels 36 used to provide positive vertical position control and entrapment. In addition, use is made of the vertical support generated by the vertically oriented magnetic field sheets interacting with corresponding elements of the ferromagnetic surface array on the guideway. Liftpack designs capable of operating in both the class "a" and "b" modes, as illustrated in FIG. 7, are useful for this purpose. Wheels 38 providing horizontal stability and steering are used to maintain appropriate horizontal positioning of levitation module 26 through such sections, or additional wheels can be provided for this purpose.

Various approaches can be resorted to for enhancing effectiveness of the liftpacks. One approach is to construct the liftpacks 24 and the corresponding arrays of ferromagnetic surfaces in a manner creating continuous magnetic circuits through the liftpacks, and through the ferromagnetic surface arrays for the combination of both vertically and horizontally oriented magnetic field sheets. The circuits consist of continuous paths of ferromagnetic materials and magnet field sources through the lift packs, and continuous ferromagnetic paths through and connecting the various elements of the array of ferromagnetic surfaces. The continuous magnetic circuits would therefore provide a path of high magnetic permeability for the magnetic fields generated by the liftpacks. They thereby will enhance the strength of the generated magnetic fields and consequently enhance their effectiveness at generating useful magnetic forces.

Figure 32:
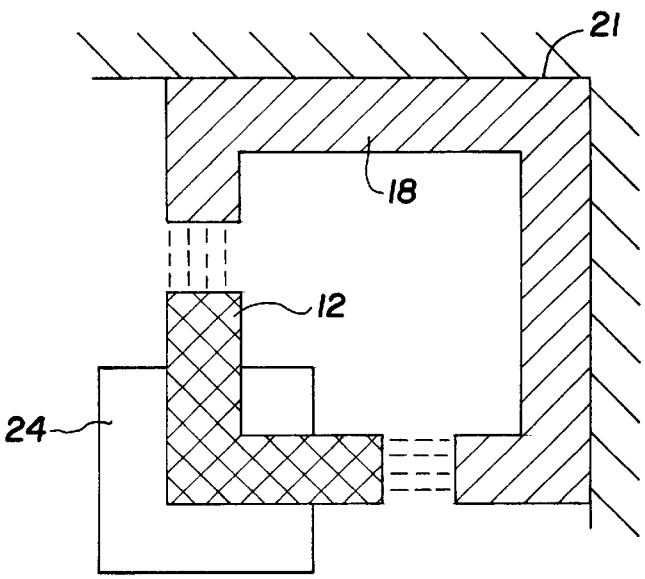
FIG. 32 diagrammatically illustrates continuous magnetic circuits for the lift packs in a support system hereof.
Figure 33A:
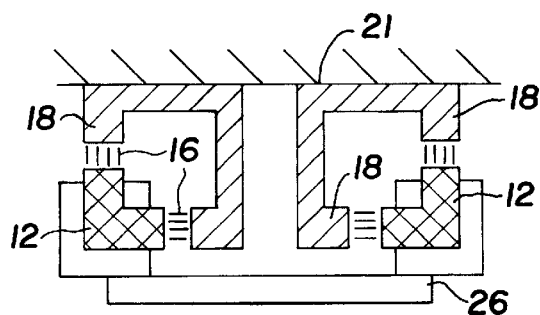
FIGS. 33(a), (b), and (c) diagrammatically illustrate continuous magnetic circuit configurations in a combined class "a" system.
Figure 33B:
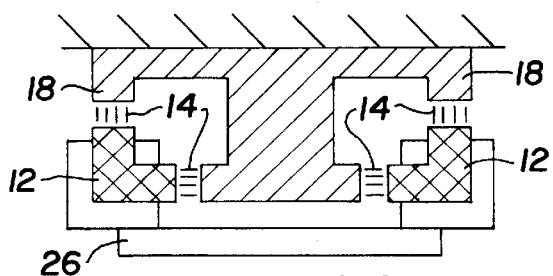
Figure 33C:
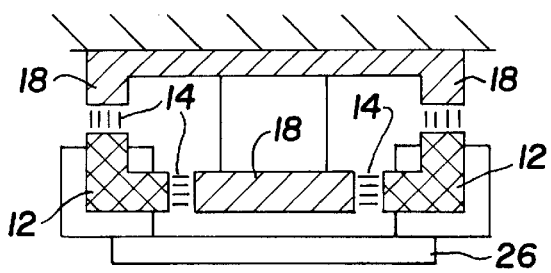
Figures 34A, 34C:
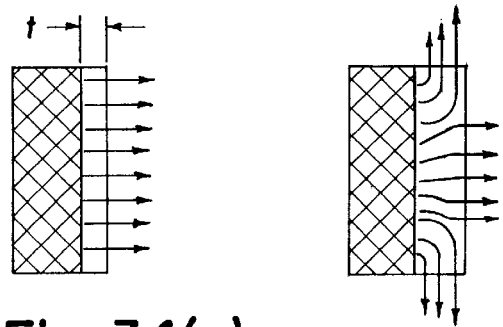
FIGS. 34(a), (b), and (c) diagrammatically illustrate the magnetic field effect achieved by adding a faceplate to the magnet compared to FIGS. 3(a), (b), and (c) without a faceplate.
Figure 34B:
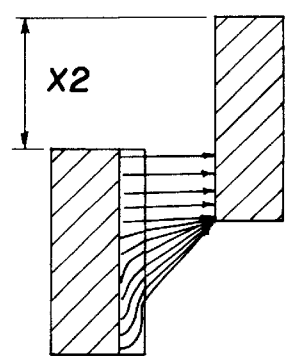

FIG. 32 illustrates the foregoing as applied to a support system configuration of FIG. 5. FIG. 33 illustrates various applications of the concept as applied to some combined class "a" options.

The effectiveness of the liftpacks 24 in generating magnetic forces for support of a payload 22 can be further enhanced by ferromagnetic materials 46 of suitable configuration directly placed on the liftpacks. As shown in FIG.

35(a), materials 46 serve to concentrate and direct the magnetic fields they generate across their respective air gaps 14. In this manner a single magnetic "main stack" in a liftpack is used to generate both the vertical and horizontal fields 14, with ferromagnetic pole pieces 46 incorporated in liftpack 24 to concentrate and direct the fields.

Figure 35A:
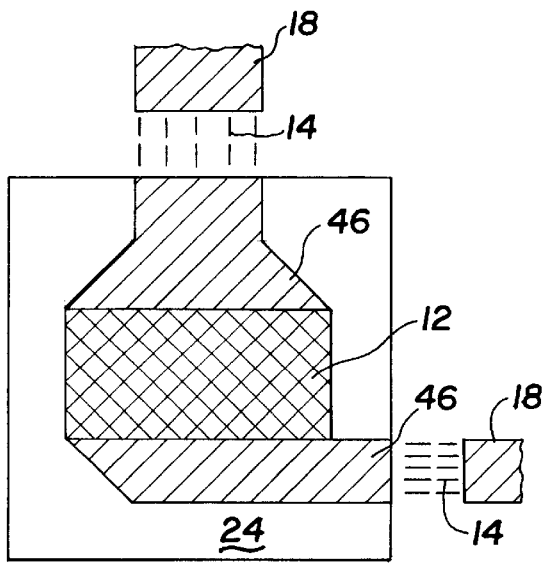
FIGS. 35(a) and (c) diagrammatically illustrate the lift pack magnetic field in a class "a" system focus without use of a series arranged booster magnet while FIGS. 35(b) and (d) diagramatically illustrate the magnetic focus with a booster magnet while FIG. 35(e) graphically illustrates relative magnetic field strengths with and without booster.
Figure 35B:
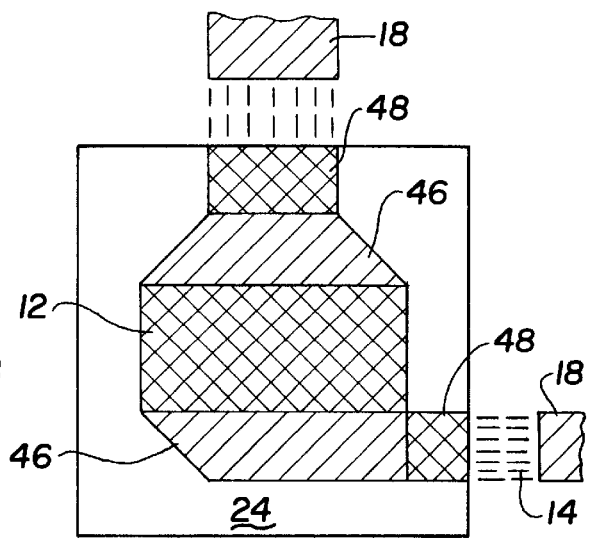

In FIG. 35(b) there is illustrated an approach to achieve additional effectiveness of the liftpacks 21 in generating magnetic forces for the support of a payload by providing boosters 48 of magnetic material at the air gap on the ferromagnetic pole pieces 46. The booster magnets have the effect of channeling a greater quantity of the flux emanating from the main stack into the air gap. Since the magnetic orientation of the booster magnets is fixed, they serve to direct the magnetic flux more completely in the desired direction across the gap.

The choice of magnet materials for booster magnets 48 can provide a resulting air gap flux that is more constant, as the gap size varies, than is possible with ferromagnetic pole pieces 46 alone. At large gap sizes, much of the flux emanating from the main stack of ferromagnetic pole pieces alone, finds alternate paths due to fringing effects. With the booster magnets 48, more of the main stack flux is directed into the booster magnets and emerges directly into the air gap 16, while the booster itself generates additional flux that is directed into the gap. This booster effect has advantages in both enhancing the effectiveness of the liftpack in generating vertically and horizontally oriented fields while at the same time reducing instabilities stemming from the parallel forces of those fields.

Figure 35C:
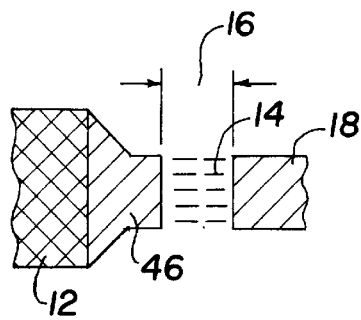
Figure 35D:
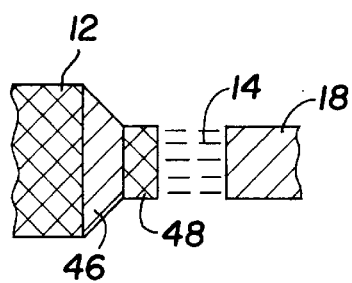
Figure 35E:
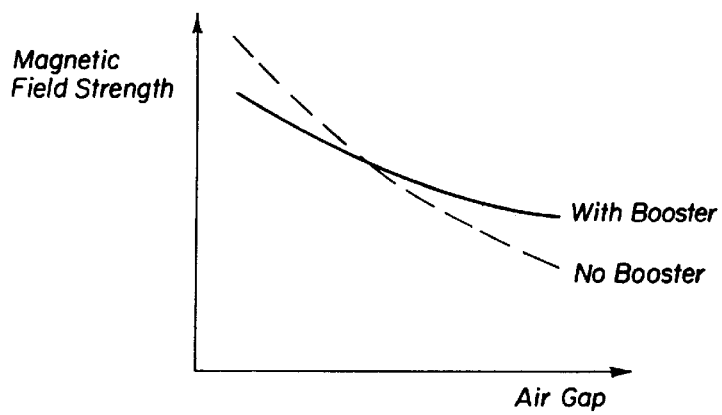

The foregoing can be best understood with reference to FIGS. 35(c), (d), and (e). At very small air gaps 16, the concentrating effects of the ferromagnetic pole pieces 46 can result in a very high level of flux that can contribute to horizontal instability in the case of horizontal fields, as illustrated in FIG. 3(a), and can even effectively reduce the range of payloads that may be supported, as indicated in FIGS. 5(d) and (e). Placing a booster magnet 48 on the gap side of the pole pieces serves to inhibit the degree of force buildup by decreasing the destabilizing flux and hence the destabilizing force that builds up at small gap sizes. This occurs because booster magnet 48 possesses a certain intrinsic level of maximum magnetic inductance, i.e., there is an inherent limit to the level of magnetic flux the magnet can generate by itself. If the pole pieces 46 attempt to increase the flux from the main stack to a level above the intrinsic inductance of the booster, the booster in effect "soaks up" some of the excess. Essentially, the booster in this arrangement tends to act as an additional length of low permeability material, like the air gap, for the main stack, thereby reducing the extent to which the resulting flux in the air gap per se increases. The main stack can "overdrive" the booster, such that the air gap flux is higher than the intrinsic flux level of the booster, but the increase is less than would occur without the booster. The proper selection of booster magnet material is instrumental in achieving and controlling this effect. That is, booster magnetic material composition is chosen having an inherent magnetic induction close to that of the desired flux level in the gap and which has a substantial capacity to absorb excess flux, i.e. a material having a high value of coercivity.

The preceding features may be combined into liftpack designs for operation in class "a" or in class "b" modes. FIG. 36(a) illustrates a class "a" liftpack, while FIGS. 36(b) and (c) illustrate class "b" liftpacks with two and three horizontal magnetic field sheets, respectively. They may also be combined into a single liftpack design as in FIG. 36(d) that is capable of acting in either a class "a" support mode, with a combination of horizontally and vertically oriented magnetic field sheets providing vertical lift, or in a class "b" mode, with only horizontally oriented field sheets providing lift, according to the configuration of the array of ferromagnetic surfaces as illustrated in FIGS. 36(e) and (f) respectively.

The arrangement of magnetic source and ferromagnetic materials within the liftpack 24 are such that in the presence of an array of two spaced apart ferromagnetic surfaces corresponding to horizontally oriented magnetic fields, the fields emanating from the liftpack are predominantly of this orientation. When however, the array of ferromagnetic surfaces contain an element corresponding to a vertically oriented magnetic field and a single element corresponding to a horizontally oriented field, the liftpack will provide both such fields. This therefore affords a method by which certain maneuvers of a transport system may preferably be conducted using a class "a" support, and others preferably with a class "b" support. They can be effected with a single design of liftpack, and a suitable variation from one location of the guideway to another of the ferromagnetic surface array according to the maneuver being conducted at a particular location.

The utility of this invention for transport application is related to its ability to accommodate a range of loads: from its empty state up to its maximum load capability, i.e., its dynamic range. Further, for reasons of economy and efficiency, it is desirable that its empty state be as light in weight as possible. Thus, it is desirable that the magnetic support technique provide vertical stability over the widest possible load range, or dynamic range. Although support wheels of the type illustrated in FIG. 21 could be provided to compensate for a limited dynamic range of the magnetic lift system, it is nonetheless desirable to increase the dynamic range of the magnetic lift system as much as possible.

For liftpack configurations of class "b", wherein only horizontally oriented magnetic field sheets are generated, the dynamic range is limited only by the maximum load that can be carried. There is no minimum load limit to consider.

However, for liftpacks of class "a", utilizing a combination of vertically and horizontally oriented magnetic fields, the minimum load that can be stably supported becomes a paramount consideration. An enhanced dynamic range for this class can be achieved by providing for control over the lifting action of the vertically oriented field relative to that of the horizontal fields, as previously described in association with FIG. 5, as a function of the total weight to be supported.

A form of control for the class "a" system is to cause the relative vertical positioning of the faces on liftpack 24 of the vertically and horizontally oriented field gaps to vary. The horizontally oriented field achieves greater lifting capability as its liftpack pole face is lowered relative to its corresponding array elements of the ferromagnetic surfaces. Conversely, the vertically oriented field achieves greater lifting capability as its liftpack pole face elevates upward more closely to its corresponding array element of the ferromagnetic surfaces.

Figure 37C:
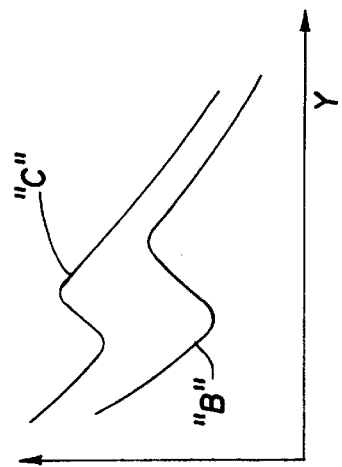
FIGS. 37(a) and (b) illustrate a lift pack arrangement for a weak and strong vertical fields respectively while FIG. 37(c) graphically illustrates the relative vertical field strength thereof as a function of gap width.
Figure 37B:
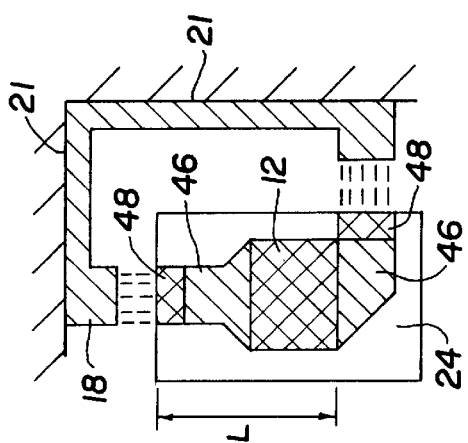
Figure 37A:
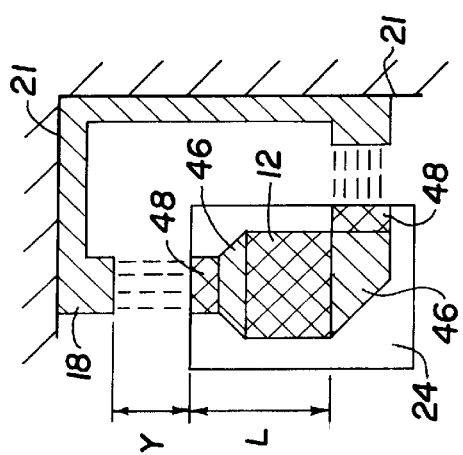
Figure 38C:
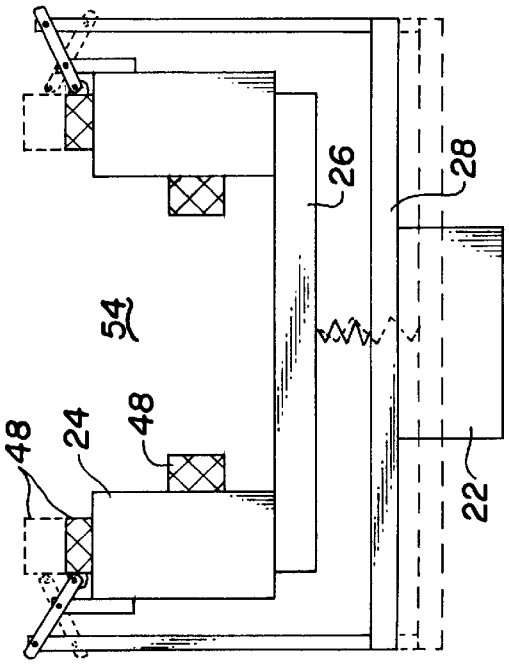
FIG. 38(a) diagramatically illustrates a lift pack configuration effecting a relatively weak vertical field for a light load versus FIG. 38(b) effecting a relatively strong vertical field for a heavy load while FIGS. 38(c) and (d) illustrate lift pack constructions mechanically and electrically, respectively for varying vertical field strength as a function of supported load.
Figure 38B:
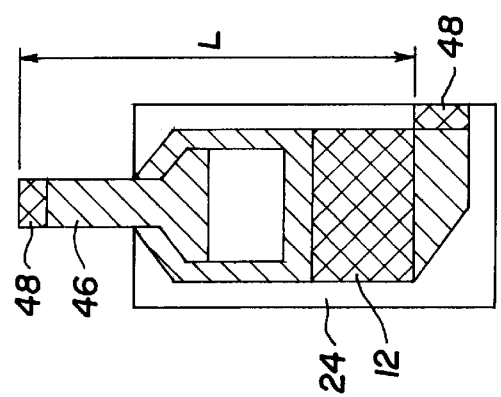
Figure 38A:
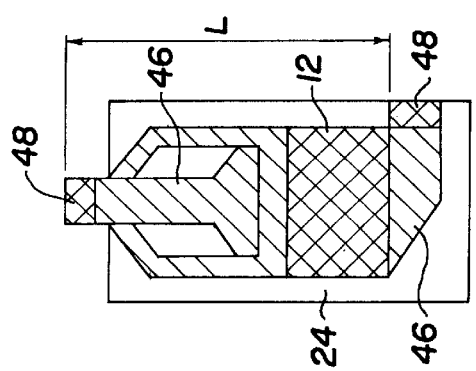

Varying the relative position of the liftpack pole faces (distance "L") for these fields provides a method of increasing or diminishing the amount of boost the vertically oriented field contributes relative to the lift of the horizontally oriented field as graphically represented in FIG. 37(c). FIG. 37(a) represents a relatively weak vertical field "B" (small "L") while FIG. 37(b) represents a relatively strong vertical field "C" (large "L"). For achieving this variation, the vertical distance "L" between the pole pieces of the vertically and horizontally oriented gaps of the liftpack is increased as the total load increases. This has the effect of bringing both of these fields more into their respective regions of maximum lift, and to decrease this distance as the load decreases, in order to reduce the total lift as illustrated in FIG. 38. FIG. 38(a) illustrates a relatively small distance "L" for a light load while FIG. 38(b) illustrates a relatively large distance "L" for a heavy load for achieving weak and strong vertical fields respectively.

Control of the relative magnet positions may be either continuous or intermittent (e.g., adjustable at times and places of loading/unloading, and locked into position at other times). It may be by passive means, effected through a spring arrangement that deflects due to a change in the applied load. Alternatively, it may be by active means, controlled by a mechanism 54 (FIG. 38 c) that senses the applied load and causes a corresponding adjustment of relative position.

Figure 38D:
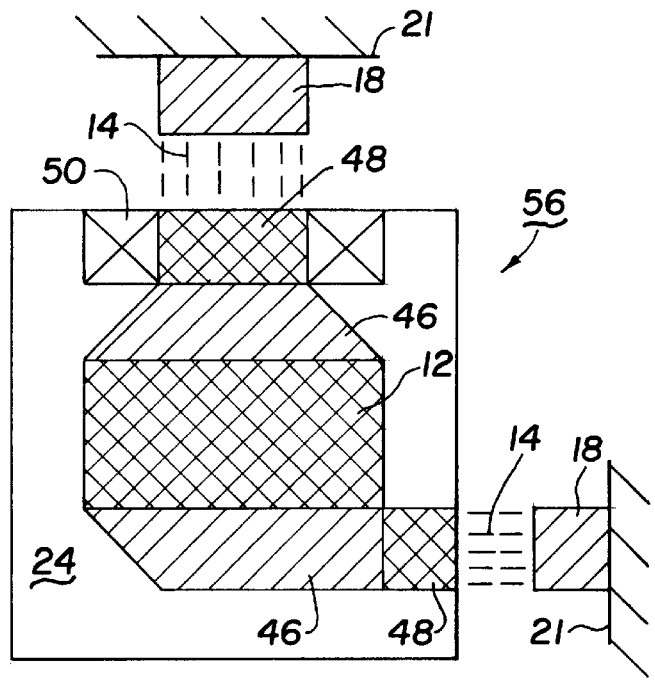
Figure 39A:
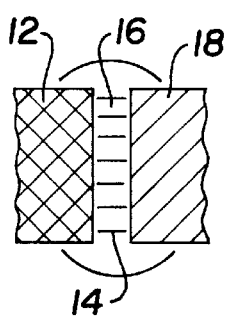
Figure 39B:
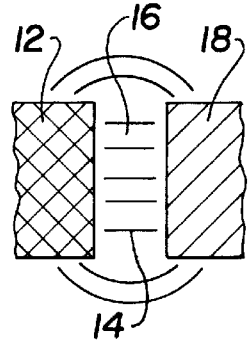
Figure 39C:
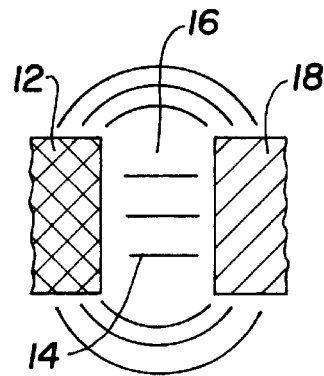
Figure 39D:
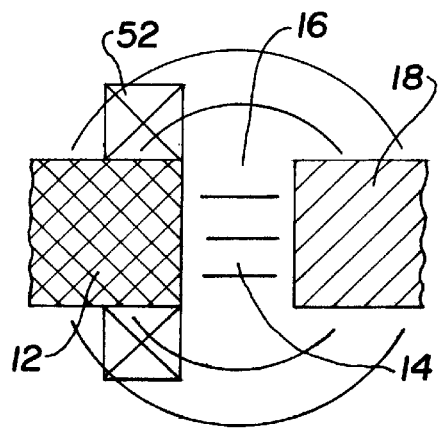
FIG. 39(d) illustrates the effect of utilizing an electrical coil for creating induced electric currents from changing magnetic flux levels.

Another approach, for achieving the foregoing control over the lifting action of the vertically oriented field is by arrangement 56 best understood with reference FIG. 38(d) that serves to maintain a fixed distance between the respective liftpack pole faces. Operationally, it modulates the field strengths by means of a direct current electromagnet 48, the current in which is controlled as a function of the weight of the applied load. As shown, the coil 50 is wound around the vertically oriented booster magnet 48. With higher payload weight, where greater lift action is desired, a greater amount of current is caused to flow in the coil in a direction so as to increase the strength of the field and the consequent vertical force. Conversely, with a lower payload weight, a lesser amount of current, or no current at all, is caused to flow in the coil. In such cases, it is possible to cause a current to flow in the coil in the opposite direction so as to reduce the total field strength even further.

Horizontal stability may be inherent to some degree in the configuration of liftpack class "a", wherein a combination of vertically and horizontally oriented magnetic field sheets are utilized. Horizontal stability is not, however, inherent in liftpack class "b", in which only horizontally oriented magnetic field sheets are utilized and it may be necessary to provide some form of horizontal control. For the transport system, described supra, wheels can be used for this purpose or may include, for example, additional devices such as a pair of electrical windings 52 around the booster magnets or pole pieces of the horizontally oriented field.

Figure 40A:
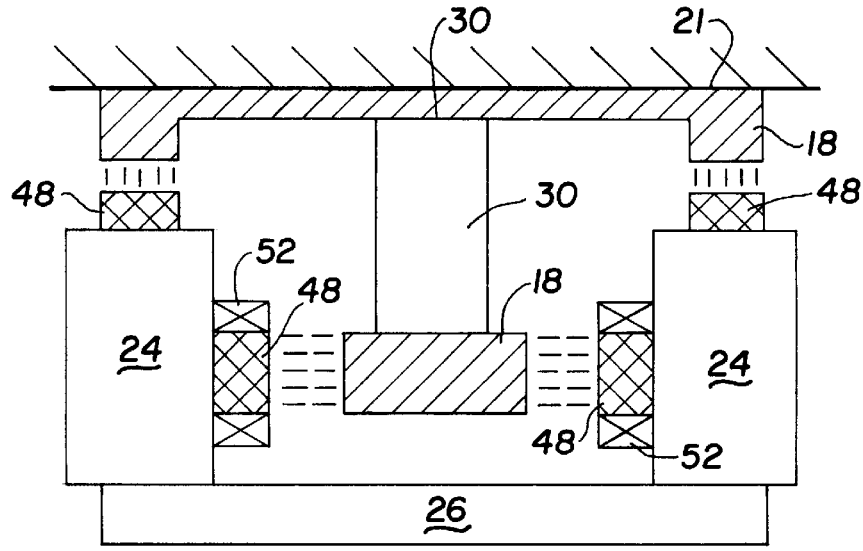
FIG. 40(a) diagramatically illustrates the effect of induced currents for reducing horizontal instability with the levitation module in varying relation to the guideway while FIGS. 40(b) and (c) illustrate differential forces and/or moments imparted by the lift packs to the levitation module including devices for their detection.

As illustrated in FIG. 39, the magnetic flux pattern can be used to cause changes in the width of air gap 16. Electrical windings 52 placed around one of the poles 12 as shown in FIG. 39 (d) will experience induced electrical currents caused by the changing flux pattern. The magnitude and direction of the induced currents is a function of the rate of change of the flux passing through them. Generally speaking, the greater the rate of change, the greater is the magnitude of the resulting induced current. Energy is absorbed from the changing magnetic field to generate these currents. If there is a resistance present to the flow of these currents, their ability to absorb energy from the magnetic field is increased. Thus, the nature of the induced currents is to oppose the changing flux, and the electrical windings will consequently tend to act as a restrictive device inhibiting a rapid change in gap size. Applying such windings to the booster magnets 48 or pole pieces 18 of the horizontally oriented field, as indicated in FIG. 40(a), will thus tend to inhibit the rate at which the liftpack 24 moves off center horizontally.

Windings 52 may be installed on each side, separated from each other. As the unit moves toward one side or the other, the changing flux patterns surrounding the booster magnet 48 or pole pieces 18 induce separate currents in each of the windings that oppose these changing fields. The degree to which these serve to effectively inhibit the rate of horizontal displacement of the unit is dependent upon the electrical resistance and inductance of the windings.

Alternatively, windings 52 on each side may be interconnected with the other side, such that as the liftpack displaces horizontally to one side or the other the changing magnetic flux patterns on each side induce a current in the combined winding that effectively opposes these changes on each side. This, too, results in a resistance to horizontal displacement that increases as speed of the displacement increases.

Should the liftpack become horizontally displaced beyond its range of inherent horizontal stability, neither of the above arrangements will result in nullifying the tendency for the unit to further displace horizontally. They will, however, tend to slow such movement and reduce its severity. This provides for reduced impact on any physical devices used to maintain horizontal positioning, such as wheels. It may also be used to facilitate the active control of horizontal positioning by increasing the response time available for any active control technique employed.

Active control of horizontal positioning may be achieved by modulating relative strengths of the opposing horizontally oriented fields. The extent to which the unit has moved off-center horizontally must first be ascertained for any such modulation to occur, in order to provide a basis for establishing the degree of corrective measure to be applied. Such off-center detection must be rapid in nature, since the response time available for correction is small (even with the counter-flux induced current windings described above). It is further desirable to effect this detection without the need for measuring a distance relative to a reference surface on the fixed surface, or the measurement of magnetic field or other condition at a particular point. Measurement of distance to a particular surface, or of conditions at a particular point, implies that the corresponding control action will be responsive to construction accuracies of the fixed surface at that point. Acceptable control characteristics may thus require undesirable high levels of precision in construction, with corresponding undesirable high costs. Conventional designs of the prior art typically rely on the presence of reference surfaces for determination of position with respect to the desired position.

Figure 40B:
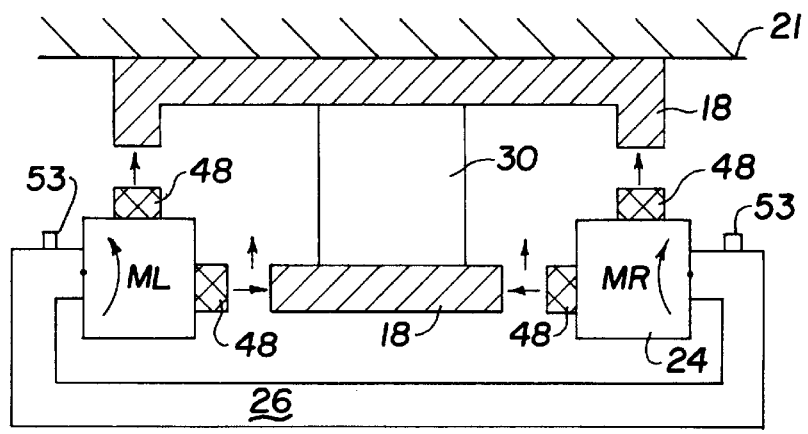
Figure 40C:
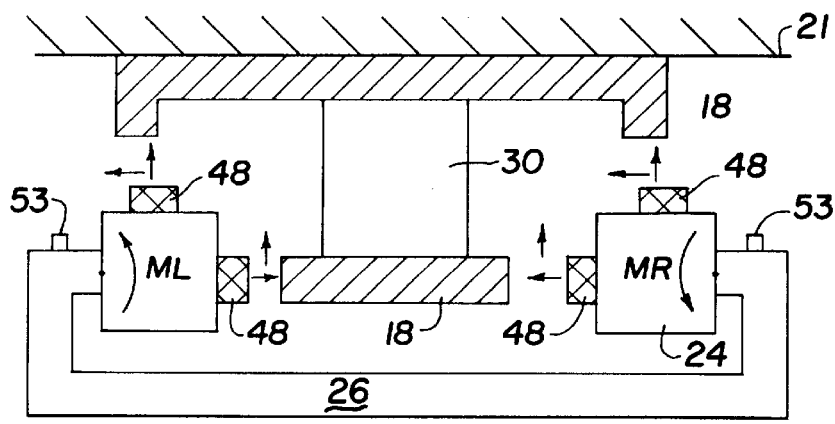

As herein provided, the extent of off-center horizontal motion is detected without the need for distance measurement to reference surfaces or of characteristics measurement at a particular location in the air gaps. Instead, horizontally and vertically oriented magnetic fields of the liftpacks 24 such as illustrated in FIGS. 40(b) and (c) result in a combination of parallel and perpendicular forces that cause different stresses and rotational moments in each of the liftpacks, due to the details of attachment of the liftpacks to the levitation module structure, as a function of horizontal displacement. These differing stresses and moments are resisted by the structure of the levitation module, and the magnitude and direction of these stresses and moments can be correlated with both the vertical and horizontal position of the unit as there shown.

These differing forces and moments may be detected and measured by a variety of known devices including strain gages and/or load cells 53, mounted on the levitation module structure holding the liftpacks or at the interface between the structure and the liftpacks. Monitoring the direction and magnitude of these differing stresses and moments affords the ability to ascertain the nature and extent of corrective action to be applied to the modulation of the horizontally oriented fields in order to maintain a desired horizontal positioning of the unit. In this manner, artificial horizontal stability is achieved, in conjunction with the inherent vertical stability, eliminating the need for reliance on guide wheels or other physical restraint for maintaining horizontal position.

Figure 41:
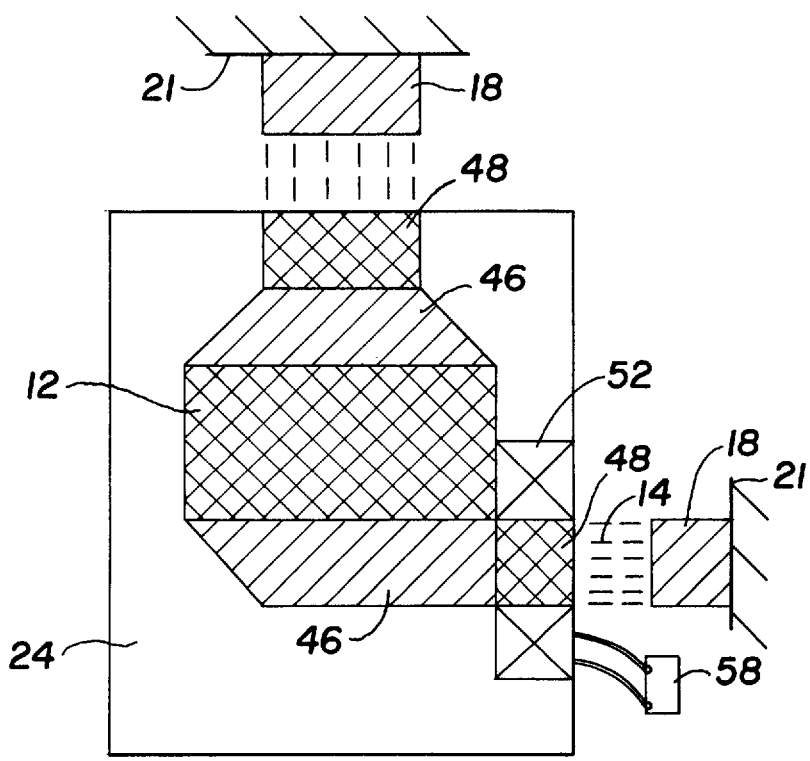
FIG. 41 diagramatically illustrates a lift pack construction utilizing a electromagnetic coil wound about the horizontal magnetic field element for achieving horizontal stability.

For actively modulating the strengths of the horizontally oriented fields, in a manner controlled by the measured forces and moments as described above, the direct current electromagnet coils 52 can be wound about the associated liftpack booster magnets 48 or pole pieces 18. The amount, direction and duration of the applied current may be determined from the measured forces and moments and controlled by a suitable power supply 58 as illustrated in FIG. 41. The nature of the modulation is to provide current in one direction to counter the magnetic field on the side where the gap is diminishing, and conversely to provide current in the opposite direction to boost the magnetic field on the side where the gap is widening.

By the above description there is disclosed novel method and apparatus for system support and conveyance of useful loads via magnetic forces. With known values of load and known values of magnetic force to be anticipated, the apparatus is operable as a system using magnets of unmodulated strength. Vertical stability is afforded over a wide range of loads without relying on complex sensing and control techniques for monitoring and controlling the lift effects of the magnets. Where applied to a conveying or transport device, enhanced performance is obtained resulting in relatively reduced capital expenditures for equipment and guideway along with lower maintenance costs than heretofore. As can be appreciated, the virtues and benefits are many in overcoming the failure to effectively capture these virtues and benefits with current systems of the prior art.

As set forth in the various embodiments described above, the invention utilizes the perpendicular force component of a horizontally oriented magnetic field to achieve inherently stable vertical support. The ability of this force component to provide stable vertical support is known, but this invention utilizes it in a distinctive manner unlike that of the prior art. In the manner hereof, the magnetic field may be generated by either constant direct current electric coils or by permanent magnets. With the field direction in the horizontal axis, it may remain constant along the length of the support apparatus, rather than being required to alternate periodically along its length for purposes of propulsion. As a consequence, a more efficient mode of levitation is effected. The source of the magnetic field may be selectively mounted on either the movable element or on the fixed surface, according to preference, rather than being mounted on both surfaces simultaneously. This results in economies from the reduced quantity of apparatus necessary to generate the fields. The lift force generated by the perpendicular component of a horizontally oriented magnetic field are augmented with that generated by a parallel component of a vertical oriented field, for purposes of enhanced performance and greater operational flexibility. Yet, these two fields emanate from the same magnetic source. In addition, the invention incorporates features to focus and concentrate these fields so as to achieve a greater net lift effect. Incorporated also are structures and configuration to facilitate passage of the movable element of a transport system through small radius horizontal curves, and includes operational structure for acceleration and deceleration by variation of horizontal field gap sizes. Operational structure is included to provide horizontal stability by modulation of horizontal field strength, without the need for a precise reference surface on the fixed element (guideway) of a transport system in the manner of the prior art while incorporating structures for adjusting the lift arising from the parallel component of a vertically oriented field in response to the weight of a load being transported.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. A magnetic support system for useful payloads comprising:

a first member providing a magnetic field source positioned in a two dimensional plane of orientation;

a second member providing an array of ferromagnetic surfaces spaced opposite from said source so as to cooperatively define an intervening gap through which the magnetic field of said source can interact;

one of said first or second members being secured to a fixed surface and the other of said first or second members being vertically displaceable;

said first member being capable of generating at least one sheet of a horizontally oriented magnetic field in a longitudinal plane normal to said two dimensional plane for effecting an attractive interaction between said source and said array and a vertical force having a force range sufficient to support a payload of contemplated weight; and a payload support on the displaceable of said first or second members for receipt of a useful payload.

2. A support system in accordance with claim 1 in which said source of said first member is capable of also generating a sheet of vertically oriented magnetic field and said second member is also provided spaced opposite thereat so as to cooperatively define an intervening gap through which the vertical magnetic field from said source can interact.

3. A support system in accordance with claim 1 in which said second member is fixed and said first member is vertically displaceable.

4. A support system in accordance with claim 1 in which said vertical force operatively resists vertical displacement between said first and second members and responsively increases resistance in correlation to increased displacement to a predetermined level within said range force before responsively decreasing resistance in correlation to further displacement increase beyond said predetermined level.

5. A support system in accordance with claim 4 in which the combination weight of the displaceable member and a supported payload on said payload support urge a downward vertical displacement resisted by said vertical force.

6. A support system in accordance with claim 2 in which said vertical force operatively resists vertical displacement between said first and second member and responsively increases resistance in correlation to increased displacement up to a predetermined level within said force range and the strength of said vertical force is enhanced by the force effects of said vertically oriented magnetic field.

7. A support system in accordance with claim 6 in which with said horizontal and vertical field sheets in a balanced relation, said vertical force affords inherently stable support for a payload on said payload support.

8. A support system in accordance with claim 6 including a horizontal restraint operative to oppose any horizontal instability of a payload on said payload support.

9. A combined support system providing magnetic support for useful payloads comprising:
a plurality of individual support systems arranged paired in rows parallel to each other with each of said individual support systems including:
a first member providing a magnetic field source positioned in a two dimensional plane of orientation; and
a second member providing an array of ferromagnetic surfaces spaced opposite from said source so as to cooperatively define an intervening gap through which the magnetic field of said source can interact;
one of said first or second members being secured to a said fixed surface and the other of said first or second members being vertically displaceable;
said first member being capable of generating at least one sheet of horizontally oriented magnetic field in a longitudinal plane normal to said two dimensional plane for effecting an attractive interaction between said source and said array and a vertical force having a force range sufficient to support a payload of contemplated weight;
a payload support on the displaceable of said first or second members for receipt of a useful payload;
the respective first members of each pair of individual support systems being arranged to emit horizontally oriented magnetic field sheets such that horizontal forces emanating between said plurality of support system oppose each other in a negating relation while generating said vertical force sufficient to maintain a lift position of a payload on said payload support.

10. A combined support system in accordance with claim 9 in which the individual of said first members are collectively either fixed or displaceable and the individual of said second members are collectively either fixed or displaceable with one of said collective members being fixed and the other of said collective members being displaceable with the collective of said displaceable members being arranged in a unit comprising a levitation module.

11. A combined support system in accordance with claim 10 in which said payload support for a received payload is mounted onto said levitation module and said levitation module provides support for a received payload from either below or suspended from overhead.

12. A combined support system in accordance with claim 11 in which said source of each of said members is capable of also generating a sheet of vertically oriented magnetic field with said second member array elements thereat and said array elements are responsive to horizontal displacement of said levitation module in the two dimensional plane of orientation by generating magnetic forces in a horizontal direction affording resistance against said horizontal displacement of said levitation module for achieving horizontal stability thereof.

13. A combined support system in accordance with claim 11 in which said payload is conveyable on said levitation module between locations and the fixed of said first or second members extend longitudinally at least the distance over which conveyance is to occur.

14. A combined support system providing magnetic transport apparatus comprising:
a plurality of individual support systems arranged paired in rows parallel to each other with each said individual support systems including:
a first member providing a magnetic field source positioned in a two dimensional plane of orientation; and
a second member providing an array of ferromagnetic surfaces spaced opposite from said source so as to cooperatively define an intervening gap through which the magnetic field of said source can interact;
one of said first or second members being secured to a fixed surface and the other of said first or second members being vertically displaceable;
said first member being capable of generating at least one sheet of a horizontally oriented magnetic field in a longitudinal plane normal to said two dimensional plane for effecting an attractive interaction between said source and said array and a vertical force having a force range sufficient to support a payload of contemplated weight;
the individual of said first members being collectively either fixed or displaceable and the individual of said second members being collectively either fixed or displaceable with one of said collective members being fixed and the other of said collective members being displaceable with the collective of said displaceable members being arranged in a unit comprising a transport carrier for conveyance of a payload and the fixed of said first or second members extend longitudinally at least the distance over which conveyance is to occur;
a guideway over which said transport carrier can be caused to travel and supporting the fixed of said members; and
the respective first members of each pair of individual support systems being arranged to emit horizontally oriented magnetic field sheets in opposing directions toward their respective arrays of ferromagnetic surfaces while generating said vertical force sufficient to maintain a lift position of said carrier on said guideway.

15. A combined support system in accordance with claim 14 in which there is included first wheels having axles horizontally oriented and affixed to either the guideway said carrier so as afford positive vertical entrapment and vertical positioning control of the relative to said guideway.

16. A support system in accordance with claim 14 in which there is included second wheels having axles vertically oriented and affixed to either said guideway or said carrier for affording positive horizontal entrapment and horizontal positioning control for the carrier relative to the guideway.

17. A support system in accordance with claim 14 in which there is included propelling apparatus for propelling said transport carrier, said propelling apparatus being selected from the group consisting of linear electric motors, reaction devices, and operable apparatus for conversion of gravitational potential energy to kinetic energy.

18. A support system in accordance with claim 14 including apparatus effecting a first controlled physical separation between elements of said array and a magnetic corresponding element of said source for imparting magnetic acceleration to said carrier in the direction of travel over said guideway.

19. A support system in accordance with claim 18 including apparatus effecting a second controlled physical separation between elements of said array and a corresponding magnetic element of said source to impart a magnetic retardation force for braking said carrier in the direction of travel over said guideway.

20. A support system in accordance with claim 14 in which the travel route of said transport carrier includes horizontal curves and there is provided control means for offsetting a variable operative effect of the horizontally oriented magnetic field sheets past said curves.

21. A support system in accordance with claim 20 in which said control means operatively utilizes residual vertically oriented forces existing from previous interaction between the horizontally oriented magnetic field sheets with said arrays.

22. A support system in accordance with claim 20 in which wheels afford horizontal steering control for the transport carrier when traversing the curved regions of said travel route.

23. A support system in accordance with claims 1, 9 or 14 including continuous magnetic circuits extending through said source and said arrays for effecting the combination of vertically and horizontally magnetic field sheets and said continuous circuits comprise continuous paths of ferromagnetic materials and magnetic field sources within said first members and continuous ferromagnetic paths in the arrays of said second members and said continuous circuits effect a path of reduced magnetic reluctance for the magnetic fields generated by said first members to enhance the lift strength and effectiveness of said fields.

24. A support system in accordance with claim 23 in which the magnetic sources of said first members comprise a stack for generating the magnetic fields therefrom and said second member comprises an array of ferromagnetic materials opposite the magnetic sources of said stack and there is included ferromagnetic materials secured to the magnetic sources of said stack to enhance direction and focus of the emanating magnetic fields from said sources into said horizontal and vertical magnetic field sheets.

25. A support system in accordance with claim 24 including at least one booster magnet secured to ferromagnetic material of said stack for directing and focusing the horizontally and vertically oriented magnetic field sheets toward the opposite elements of said second member arrays.

26. A support system in accordance with claim 25 in which said booster magnet comprises a permanent magnet at each of a plurality of said ferromagnetic materials and of selected energy levels able to increase the magnetic field strength across said gap at relatively larger gap sizes while restricting field buildup at relatively small gap sizes.

27. A support system in accordance with claims 1, 9 or 14 in which there is included control means to presettably adjust the size of air gaps in correlation to the magnitude of payload to be supported in order to increase the operable load range within an inherent range of vertical stability.

28. A support system in accordance with claim 27 in which said control means comprises a counterspring responsive to the weight of a received payload for effectively varying said air gaps in correlation to the weight of a received payload.

29. A support system in accordance with claim 27 in which said control means comprises weight sensing apparatus responsive to changes in ascertained payload weight to operatively alter the relative positions of the vertical and horizontal air gaps.

30. A support system in accordance with claim 26 including an electromagnetic coil surrounding at least one of said booster magnets forming with an associated pole piece said vertically oriented gap for adjustably varying the strength of the vertically oriented field in accordance with a predetermined need.

31. A support system in accordance with claim 30 including controls for varying D.C. current flow to said electromagnetic coil for varying the attractive force of said vertically oriented gap.

32. A support system in accordance with claim 25 including an electromagnetic coil surrounding at least one of said booster magnets forming with an associated pole piece said horizontally oriented gap for adjustably varying the strength of said horizontally oriented gap for contributing to horizontal stability of a payload received on said payload support.

33. A support system in accordance with claim 32 in which changes in flux pattern at said horizontally oriented air gap cause induced electrical current in said electromagnetic coil that is operatively effective to inhibit the rate of horizontal displacement of a supported payload.

34. A support system in accordance with claims 9 or 14 including force detection apparatus for measuring force levels associated with horizontal displacement of a supported payload.

35. A support system in accordance with claim 34 in which said electrical winding surrounding the horizontally oriented air gap booster magnet is of direct current and there is included control means to vary said direct current through said electrical winding for maintaining horizontal stability of a payload on said payload support by altering the magnetic field strength in said air gap.

\* \* \* \* \*